US012720118B2

(12) United States Patent
Yan et al.

(10) Patent No.: US 12,720,118 B2
(45) Date of Patent: Aug. 25, 2026

(54) NONLOCAL LOOP FILTER FOR VIDEO CODING

(71) Applicant: BEIJING DAJIA INTERNET INFORMATION TECHNOLOGY CO., LTD., Beijing (CN)

(72) Inventors: Ning Yan, San Diego, CA (US); Yi-Wen Chen, San Diego, CA (US); Xiaoyu Xiu, San Diego, CA (US); Che-Wei Kuo, San Diego, CA (US); Hong-Jheng Jhu, San Diego, CA (US); Wei Chen, San Diego, CA (US); Han Gao, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/899,174

(22) Filed: Sep. 27, 2024

(65) Prior Publication Data

US 2025/0030899 A1 Jan. 23, 2025

Related U.S. Application Data

(63) Continuation of application No. PCT/US2023/016642, filed on Mar. 28, 2023.

(Continued)

(51) Int. Cl.

*H04N 19/82* (2014.01)
*H04N 19/117* (2014.01)

(Continued)

(52) U.S. Cl.

CPC ........... *H04N 19/82* (2014.11); *H04N 19/117* (2014.11); *H04N 19/176* (2014.11); *H04N 19/70* (2014.11)

(58) Field of Classification Search

CPC .. H04N 19/117; H04N 19/174; H04N 19/176; H04N 19/70; H04N 19/82

See application file for complete search history.

(56) References Cited

U.S. PATENT DOCUMENTS

2008/0247462 A1* 10/2008 Demos .................. H04N 19/63 375/240.03

2009/0010539 A1* 1/2009 Guarnera ............... G06T 3/403 382/167

(Continued)

OTHER PUBLICATIONS

International Search Report of PCT/US2023/016642 issued by ISA/KR dated Jul. 13, 2023, (4p).

(Continued)

*Primary Examiner* — Md N Haque

(74) *Attorney, Agent, or Firm* — Arch & Lake LLP; Hao Tan; Shen Wang

(57) ABSTRACT

A method for video encoding, a method for video decoding, apparatuses and non-transitory computer-readable storage media thereof are provided. In the method for video decoding, the decoder may obtain one or more filtering parameters, wherein the one or more filtering parameters are from a filtering parameter set comprising a number of similar blocks, a search range, and a window size; obtain, based on the one or more filtering parameters, one or more similar pixels for a first pixel that has been filtered in a picture and the first pixel; and obtain an original pixel associated with the first pixel based on the one or more similar pixels.

20 Claims, 14 Drawing Sheets

Obtain, at the encoder side, one or more similar pixels for a first pixel that is to be filtered in a picture based on a filtering parameter set, where the one or more similar pixels and the first pixel are from the picture, and the filtering parameter set includes a number of similar blocks, a search range, and a window size 1101

Obtain, at the encoder side, a filtered pixel for the first pixel based on the one or more similar pixels 1102

Obtain, at the decoder side, one or more filtering parameters, where one or more filtering parameters are from a filtering parameter set that includes a number of similar blocks, a search range, and a window size 1201

Obtain, at the decoder side, one or more similar pixels for a first pixel that has been filtered in a picture and the first pixel based on the one or more filtering parameters 1202

Obtain, at the decoder side, an original pixel associated with the first pixel based on the one or more similar pixels 1203

Related U.S. Application Data

(60) Provisional application No. 63/324,631, filed on Mar. 28, 2022.

(51) Int. Cl.
*H04N 19/176* (2014.01)
*H04N 19/70* (2014.01)

(56) References Cited

U.S. PATENT DOCUMENTS

| | | | | |
|---|---|---|---|---|
| 2015/0201217 | A1* | 7/2015 | Lu | H04N 19/176 375/240.29 |
| 2017/0098317 | A1 | 4/2017 | Qi et al. | |
| 2019/0045224 | A1* | 2/2019 | Huang | H04N 19/147 |
| 2019/0082176 | A1 | 3/2019 | Zhang et al. | |
| 2019/0268593 | A1* | 8/2019 | Li | H04N 19/46 |
| 2019/0313125 | A1* | 10/2019 | Stepin | H04N 19/126 |
| 2019/0394464 | A1* | 12/2019 | Stepin | H04N 19/117 |
| 2020/0296388 | A1* | 9/2020 | Bordes | H04N 19/176 |
| 2021/0287417 | A1 | 9/2021 | Afra et al. | |
| 2022/0385896 | A1* | 12/2022 | Ding | G06N 3/04 |
| 2023/0188746 | A1* | 6/2023 | Xu | H04N 19/132 375/240.16 |

OTHER PUBLICATIONS

Extended European Search Report of EP Application No. 23781716.8 date May 21, 2026, (16p).

Zhao Wang et al., "Description of SDR video coding technology proposal by DJI and Peking University", Joint Video Experts Team (JVET) of ITU-T SG 16 WP 3 and ISO/IEC JTC 1/SC 29/WG 11, JVET-J0011-v1, 10th Meeting: San Diego, US, Apr. 10-20, 2018, (38p).

Xinfeng Zhang et al., "Low-Rank-Based Nonlocal Adaptive Loop Filter for High-Efficiency Video Compression", IEEE Transactions On Circuits and Systems for Video Technology, vol. 27, No. 10, Oct. 2017, p. 2177-p. 2188, (12p).

Adrian Browne et al., "Algorithm description for Versatile Video Coding and Test Model 15 (VTM15)", Joint Video Experts Team (JVET) of ITU-T SG 16 WP 3 and ISO/IEC JTC 1/SC 29, JVET-X2002-v1, 24th Meeting, by teleconference, Oct. 6-15, 2021, (114p).

Masaaki Matsumura et al., "Largest Coding Unit Based Framework for Non-local Means Filter", Signal&Information Processing Association Annual Summit and Conference (APSIP ASC), 2012 Asia-Pacific IEEE, Dec. 3, 2012, pp. 1-4, (4p).

Jacob Ström et al., "EE2: Bilateral filter in VTM, EE2 and VVenC", Joint Video Experts Team (JVET) of ITU-T SG 16 WP 3 and ISO/IEC JTC 1/SC 29, JVET-V0094, 22nd Meeting, by teleconference, Apr. 20-28, 2021, (10p).

* cited by examiner

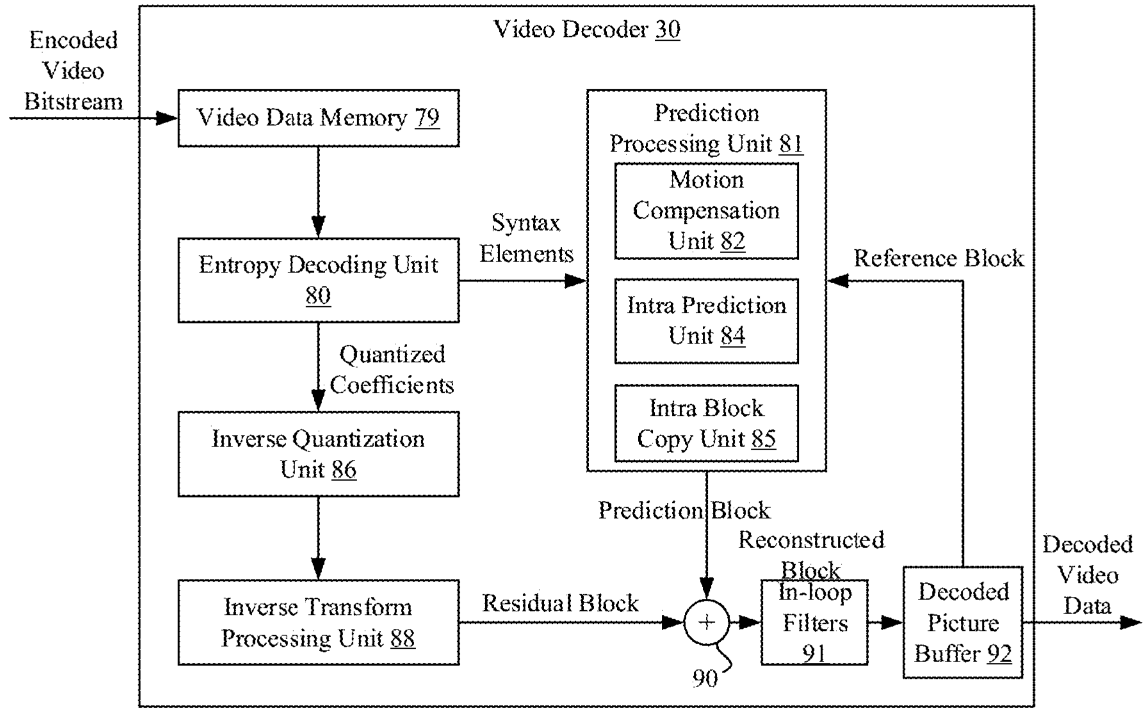
FIG. 2B
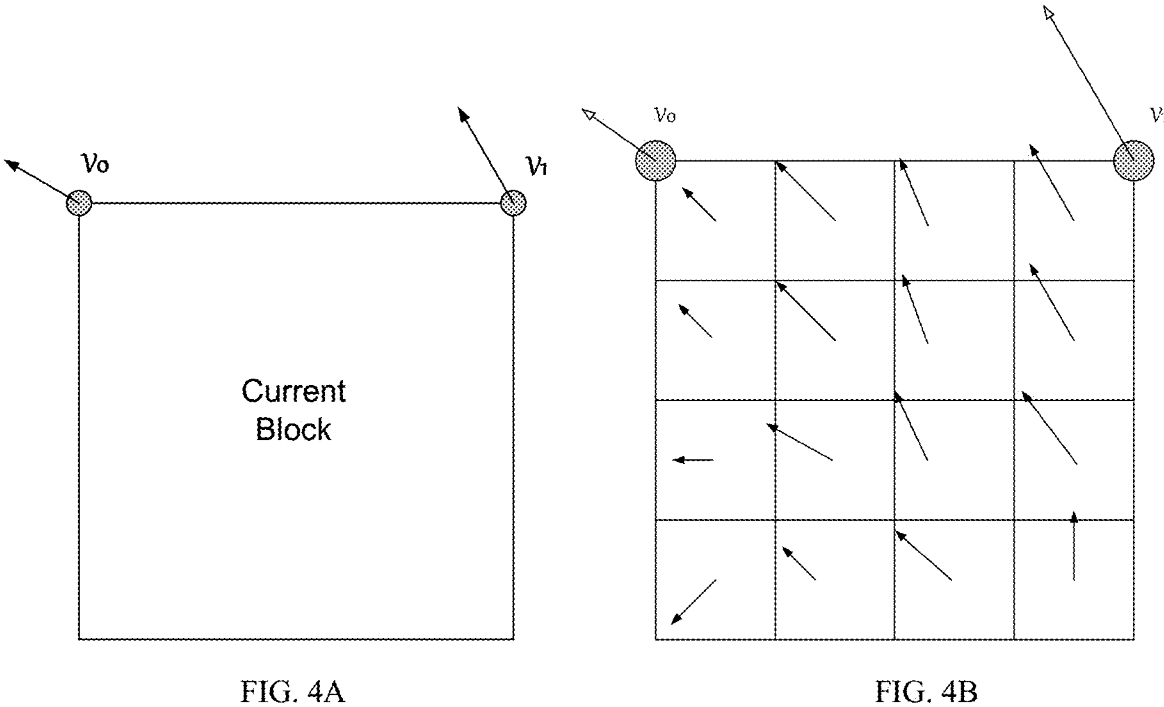
FIG. 4A
FIG. 4B

| V | | V | | V | | V | |
|---|---|---|---|---|---|---|---|
| | V | | V | | V | | V |
| V | | V | | V | | V | |
| | V | | V | | V | | V |
| V | | V | | V | | V | |
| | V | | V | | V | | V |
| V | | V | | V | | V | |
| | V | | V | | V | | V |

FIG. 6A

| H | | H | | H | | H | |
|---|---|---|---|---|---|---|---|
| | H | | H | | H | | H |
| H | | H | | H | | H | |
| | H | | H | | H | | H |
| H | | H | | H | | H | |
| | H | | H | | H | | H |
| H | | H | | H | | H | |
| | H | | H | | H | | H |

FIG. 6B

| D1 | | D1 | | D1 | | D1 | |
|---|---|---|---|---|---|---|---|
| | D1 | | D1 | | D1 | | D1 |
| D1 | | D1 | | D1 | | D1 | |
| | D1 | | D1 | | D1 | | D1 |
| D1 | | D1 | | D1 | | D1 | |
| | D1 | | D1 | | D1 | | D1 |
| D1 | | D1 | | D1 | | D1 | |
| | D1 | | D1 | | D1 | | D1 |

FIG. 6C

| D2 | | D2 | | D2 | | D2 | |
|---|---|---|---|---|---|---|---|
| | D2 | | D2 | | D2 | | D2 |
| D2 | | D2 | | D2 | | D2 | |
| | D2 | | D2 | | D2 | | D2 |
| D2 | | D2 | | D2 | | D2 | |
| | D2 | | D2 | | D2 | | D2 |
| D2 | | D2 | | D2 | | D2 | |
| | D2 | | D2 | | D2 | | D2 |

FIG. 6D

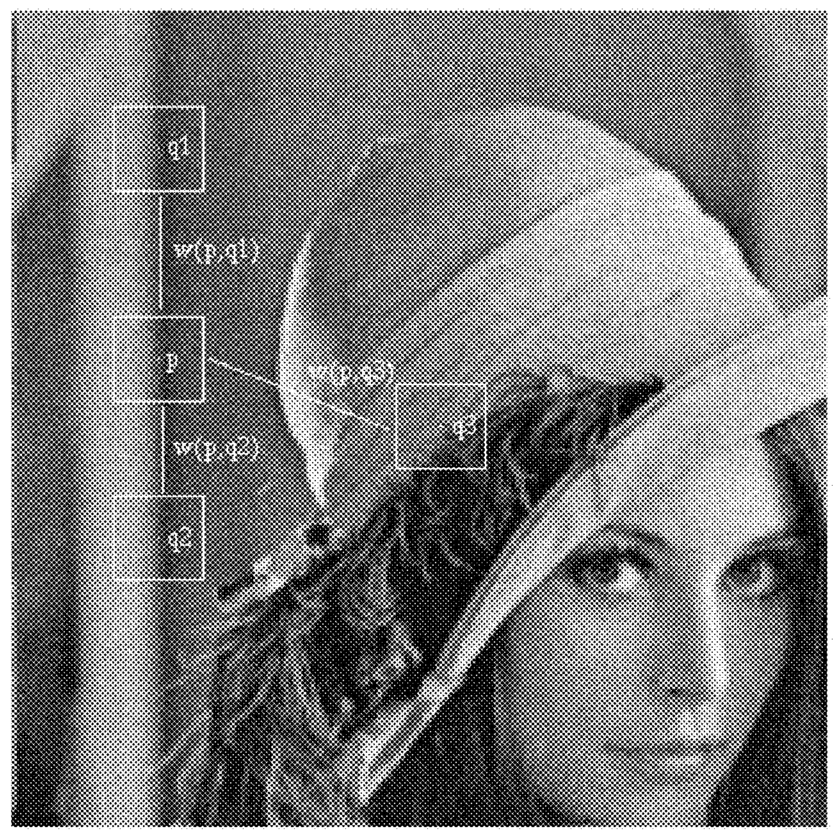

FIG. 9

Obtain, at the encoder side, one or more similar pixels for a first pixel that is to be filtered in a picture based on a filtering parameter set, where the one or more similar pixels and the first pixel are from the picture, and the filtering parameter set includes a number of similar blocks, a search range, and a window size 1101

↓

Obtain, at the encoder side, a filtered pixel for the first pixel based on the one or more similar pixels 1102

FIG. 11

| | | $I_{AA}$ | | |
|---|---|---|---|---|
| | $I_{NW}$ | $I_A$ | $I_{NE}$ | |
| $I_{LL}$ | $I_L$ | $I_C$ | $I_R$ | $I_{RR}$ |
| | $I_{SW}$ | $I_B$ | $I_{SE}$ | |
| | | $I_{BB}$ | | |

FIG. 13

NONLOCAL LOOP FILTER FOR VIDEO CODING

CROSS-REFERENCE TO RELATED APPLICATIONS

The present application is a continuation application of International Patent Application No. PCT/US2023/016642 filed on Mar. 28, 2023, which claims priority to U.S. Provisional Application No. 63/324,631, entitled "Nonlocal Loop Filter for Video Coding" filed on Mar. 28, 2022, the entire disclosures of which are incorporated by reference for all purposes.

FIELD

The present disclosure relates to video coding and compression, and in particular but not limited to, methods and apparatus for on improving the coding efficiency of filtering in video coding.

BACKGROUND

Various video coding techniques may be used to compress video data. Video coding is performed according to one or more video coding standards. For example, nowadays, some well-known video coding standards include Versatile Video Coding (VVC), High Efficiency Video Coding (HEVC, also known as H.265 or MPEG-H Part2) and Advanced Video Coding (AVC, also known as H.264 or MPEG-4 Part 10), which are jointly developed by ISO/IEC MPEG and ITU-T VECG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The AVS1 standard video part was promulgated as the Chinese national standard in February 2006. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. In May 2016, the AVS2 was issued as the Chinese national standard. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC. In March 2019, at the 68-th AVS meeting, the AVS3-P2 baseline was finished, which provides approximately 30% bit-rate savings over the HEVC standard. Currently, there is one reference software, called high performance model (HPM), is maintained by the AVS group to demonstrate a reference implementation of the AVS3 standard.

SUMMARY

The present disclosure relates to video coding and compression, and in particular but not limited to, improving coding efficiency of filtering in video coding. More specifically, nonlocal correlations are exploited in the loop filtering modules.

According to a first aspect of the present disclosure, there is provided a method for video encoding. In the method, an encoder may obtain one or more similar pixels for a first pixel that is to be filtered in a picture based on a filtering parameter set. Additionally, the one or more similar pixels and the first pixel are from the picture, and the filtering parameter set comprises a number of similar blocks, a search range, and a window size.

According to a second aspect of the present disclosure, there is provided a method for video decoding. In the method, a decoder may obtain one or more filtering parameters, where the one or more filtering parameters are from a filtering parameter set including a number of similar blocks, a search range, and a window size. Additionally, the decoder may obtain one or more similar pixels for a first pixel that has been filtered in a picture and the first pixel based on the one or more filtering parameters. Furthermore, the decoder may obtain an original pixel associated with the first pixel based on the one or more similar pixels.

According to a third aspect of the present disclosure, there is provided an apparatus for video encoding. The apparatus includes one or more processors and a memory coupled to the one or more processors and configured to store instructions executable by the one or more processors. Furthermore, the one or more processors, upon execution of the instructions, are configured to perform the method according to the first aspect above.

According to a fourth aspect of the present disclosure, there is provided an apparatus for video decoding. The apparatus includes one or more processors and a memory coupled to the one or more processors and configured to store instructions executable by the one or more processors. Furthermore, the one or more processors, upon execution of the instructions, are configured to perform the method according to the second aspect above.

According to a fifth aspect of the present disclosure, there is provided a non-transitory computer-readable storage medium storing computer-executable instructions that, when executed by one or more computer processors, cause the one or more computer processors to receive a bitstream, and perform the method according to the second aspect.

According to a sixth aspect of the present disclosure, there is provided a non-transitory computer-readable storage medium storing computer-executable instructions that, when executed by one or more computer processors, cause the one or more computer processors to perform the method according to the first aspect to encode a current block into a bitstream, and transmit the bitstream.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 2B is a block diagram illustrating an exemplary video decoder in accordance with some examples of the present disclosure.

FIGS. 4A-4B illustrate 4-parameter affine model in accordance with some examples of the present disclosure.

FIGS. 6A-6D illustrate subsampled Laplacian calculation in accordance with some examples of the present disclosure.

FIG. 9 illustrates nonlocal mean filter in accordance with some examples of the present disclosure.

FIG. 11 is a flow chart illustrating a method for video encoding in accordance with some examples of the present disclosure.

FIG. 13 is a block diagram illustrating samples surrounding the center sample in accordance with some implementations of the present disclosure.

DETAILED DESCRIPTION

Figure 1A:
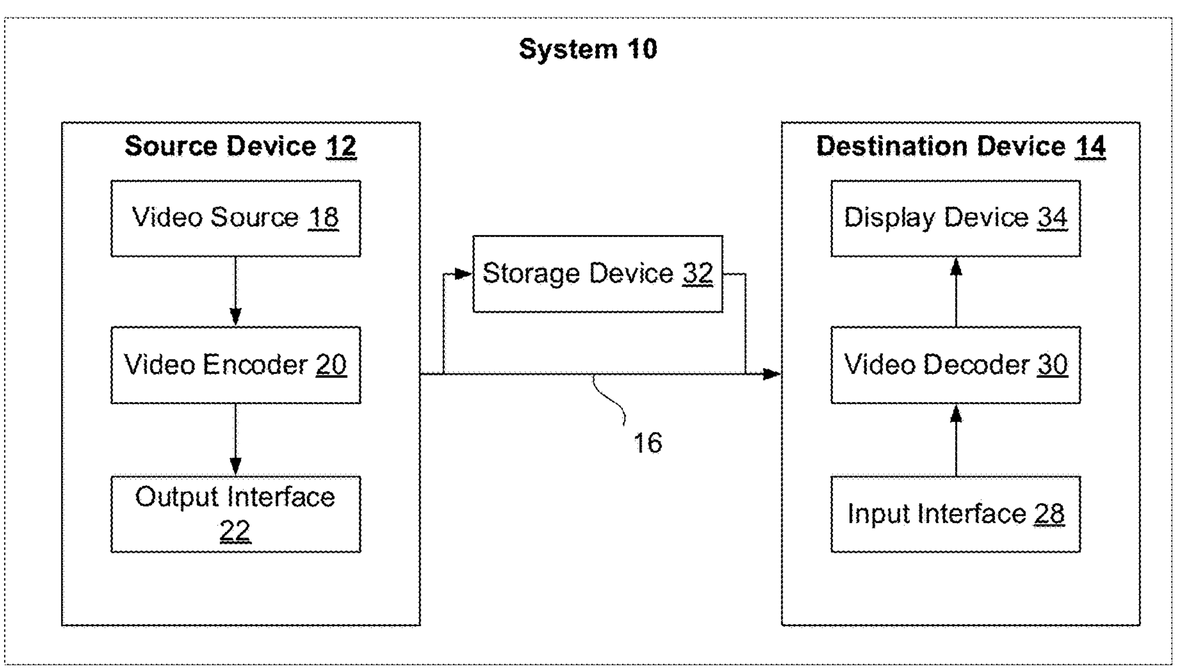
FIG. 1A is a block diagram illustrating a system for encoding and decoding video blocks in accordance with some examples of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Terms used in the disclosure are only adopted for the purpose of describing specific embodiments and not intended to limit the disclosure. "A/an," "said," and "the" in a singular form in the disclosure and the appended claims are also intended to include a plural form, unless other meanings are clearly denoted throughout the disclosure. It is also to be understood that term "and/or" used in the disclosure refers to and includes one or any or all possible combinations of multiple associated items that are listed.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1A is a block diagram illustrating an exemplary system 10 for encoding and decoding video blocks in parallel in accordance with some implementations of the present disclosure. As shown in FIG. 1A, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of moving the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 1A, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may include camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Like HEVC, VVC is built upon the block-based hybrid video coding framework. FIG. 1B is a block diagram illustrating a block-based video encoder in accordance with some implementations of the present disclosure. In the encoder 100, the input video signal is processed block by block, called coding units (CUs). The encoder 100 may be the video encoder 20 as shown in FIG. 1A. In VTM-1.0, a CU can be up to 128×128 pixels. However, different from the HEVC which partitions blocks only based on quad-trees, in VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

Figures 3A, 3B, 3C, 3D, 3E, 3F, 3G:
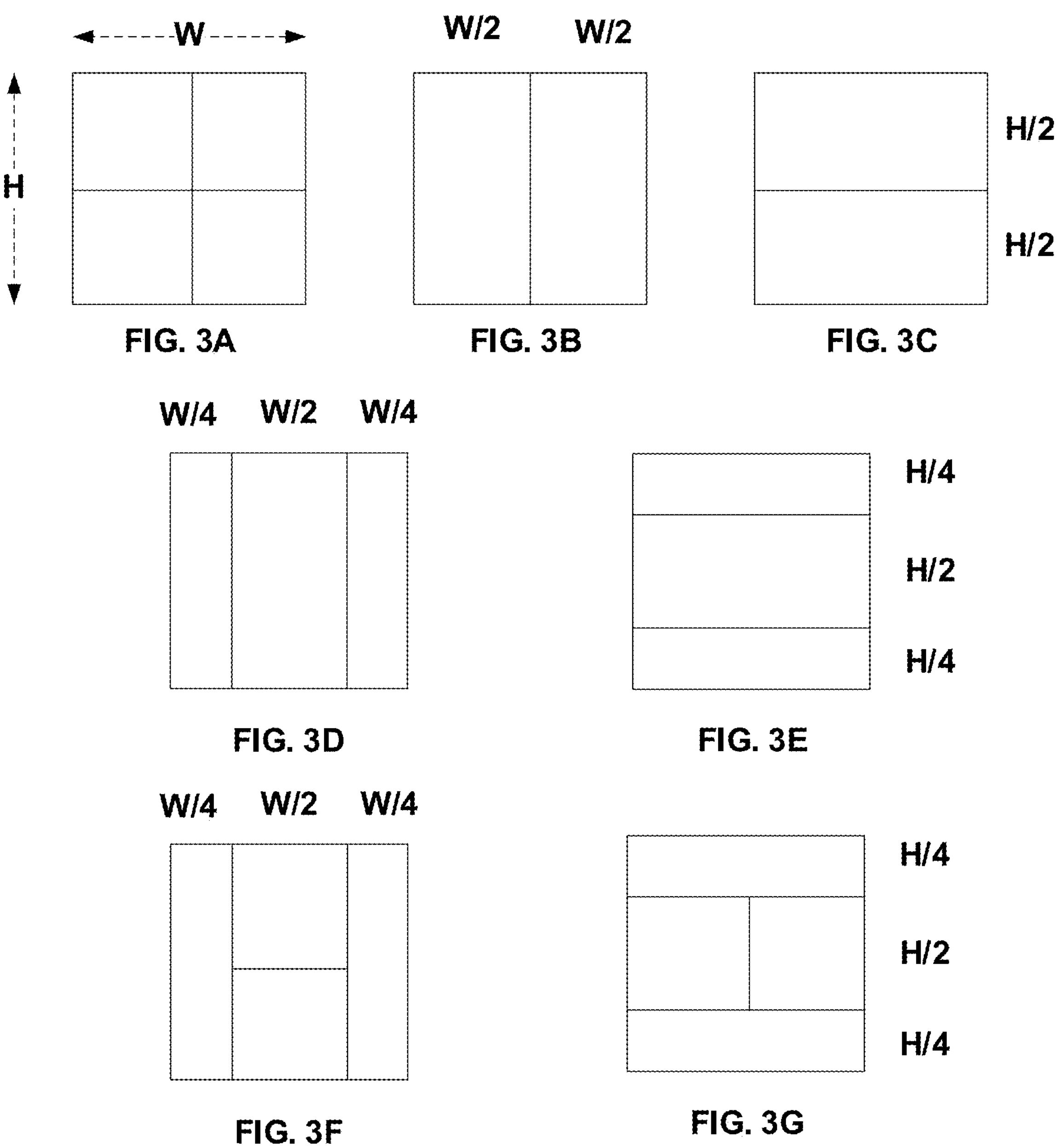
FIG. 3A is a diagram illustrating block partitions in a multi-type tree structure in accordance with some examples of the present disclosure.
FIG. 3B is a diagram illustrating block partitions in a multi-type tree structure in accordance with some examples of the present disclosure.
FIG. 3C is a diagram illustrating block partitions in a multi-type tree structure in accordance with some examples of the present disclosure.
FIG. 3D is a diagram illustrating block partitions in a multi-type tree structure in accordance with some examples of the present disclosure.
FIG. 3E is a diagram illustrating block partitions in a multi-type tree structure in accordance with some examples of the present disclosure.
FIG. 3F is a diagram illustrating block partitions in a multi-type tree structure in accordance with some examples of the present disclosure.
FIG. 3G is a diagram illustrating block partitions in a multi-type tree structure in accordance with some examples of the present disclosure.

FIGS. 3A-3G are schematic diagrams illustrating multi-type tree splitting modes in accordance with some implementations of the present disclosure. FIGS. 3A-3G respectively show seven splitting types including quaternary partitioning (FIG. 3A), vertical binary partitioning (FIG. 3B), horizontal binary partitioning (FIG. 3C), vertical ternary partitioning (FIG. 3D), horizontal ternary partitioning (FIG. 3E), vertical extended ternary partitioning (FIG. 3F), horizontal extended ternary partitioning (FIG. 3G).

For each given video block, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes.

After spatial and/or temporal prediction, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO is defined to further improve coding efficiency. In the now-current version of the VVC standard, yet another in-loop filter called ALF is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 1C:
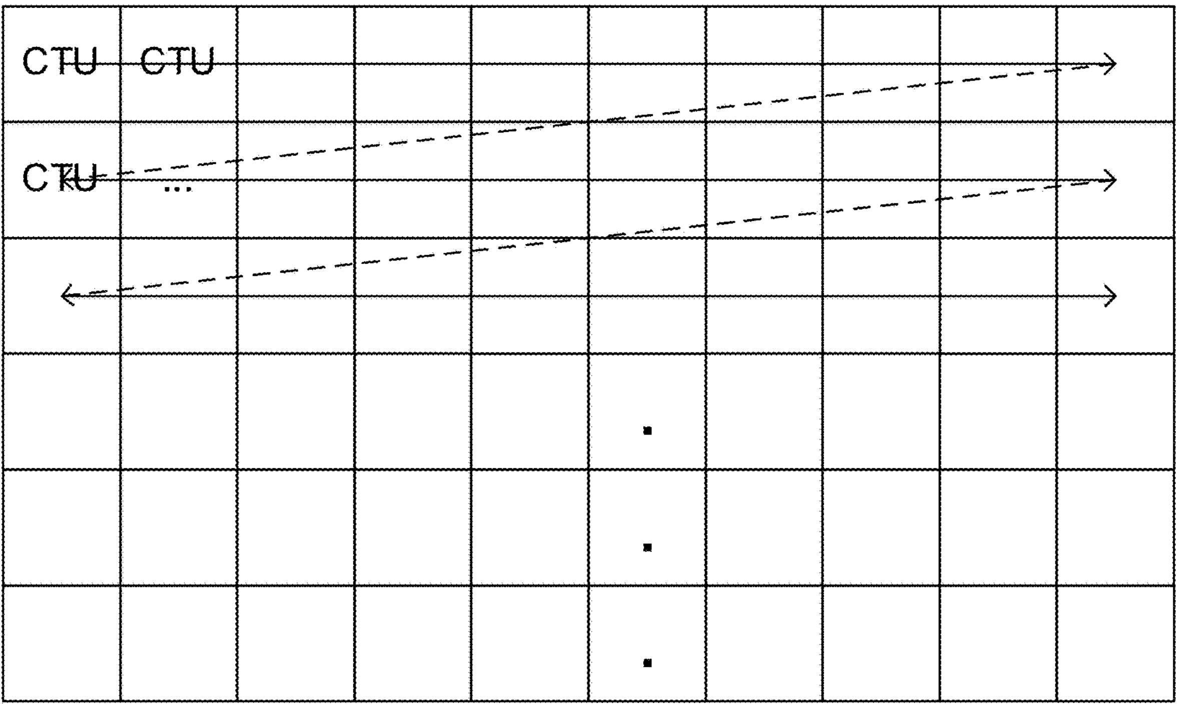
FIGS. 1C-1F are block diagrams illustrating how a frame is recursively partitioned into multiple video blocks of different sizes and shapes in accordance with some examples of the present disclosure.
Figure 1B:
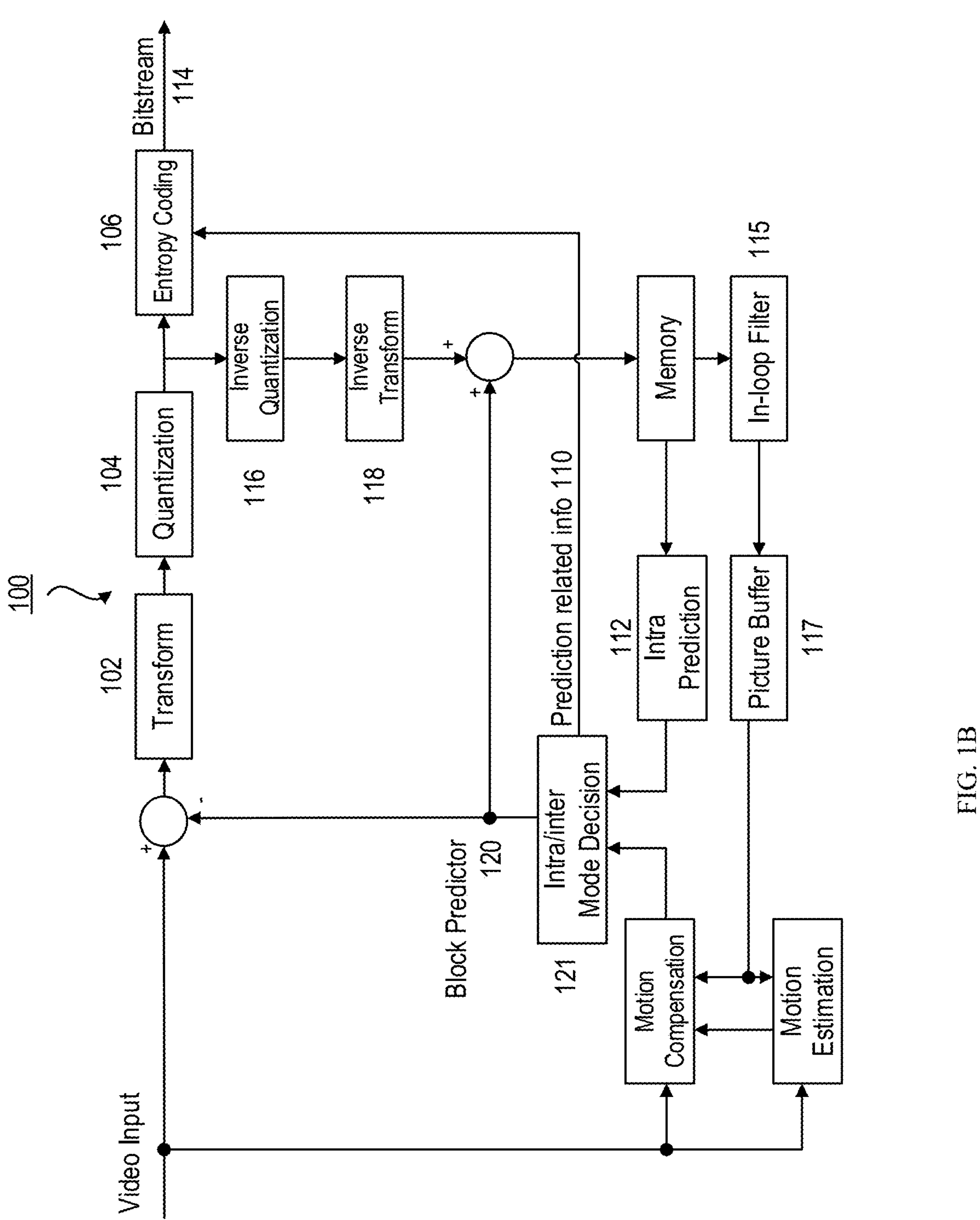
FIG. 1B is a block diagram of an encoder in accordance with some examples of the present disclosure.
Figure 2A:
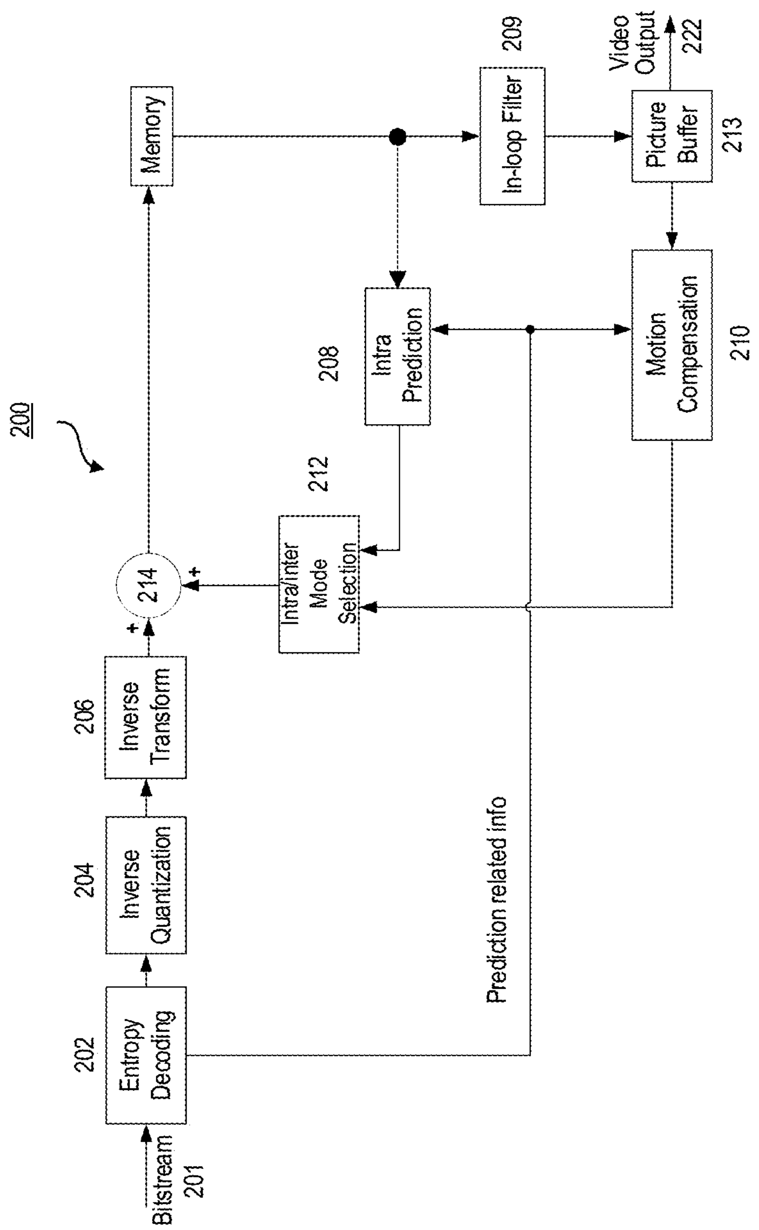
FIG. 2A is a block diagram of a decoder in accordance with some examples of the present disclosure.

FIG. 2A is a block diagram illustrating a block-based video decoder 200 which may be used in conjunction with many video coding standards. This decoder 200 is similar to the reconstruction-related section residing in the encoder 100 of FIG. 1B. The block-based video decoder 200 may be the video decoder 30 as shown in FIG. 1A. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

Figure 1D:
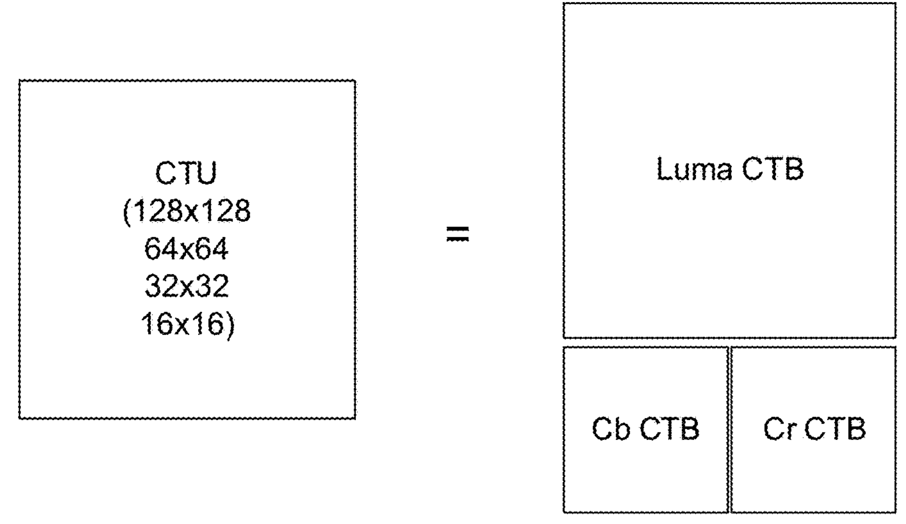
Figure 1F:
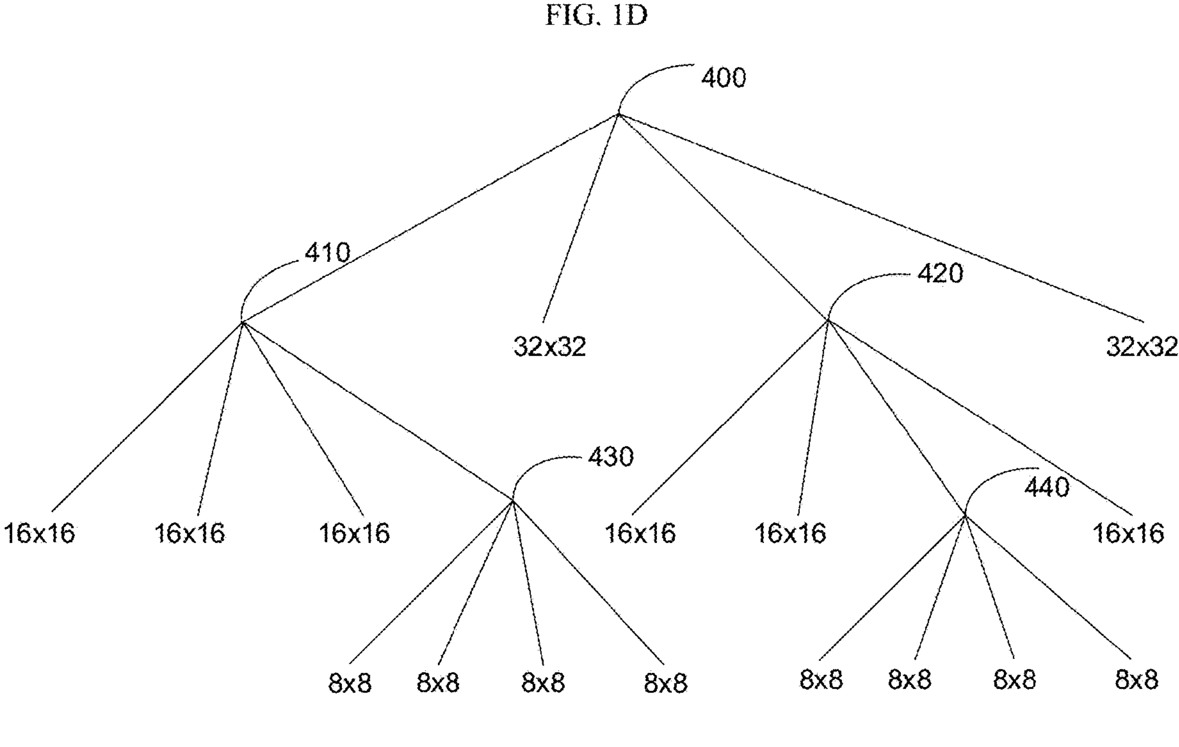
Figure 1E:
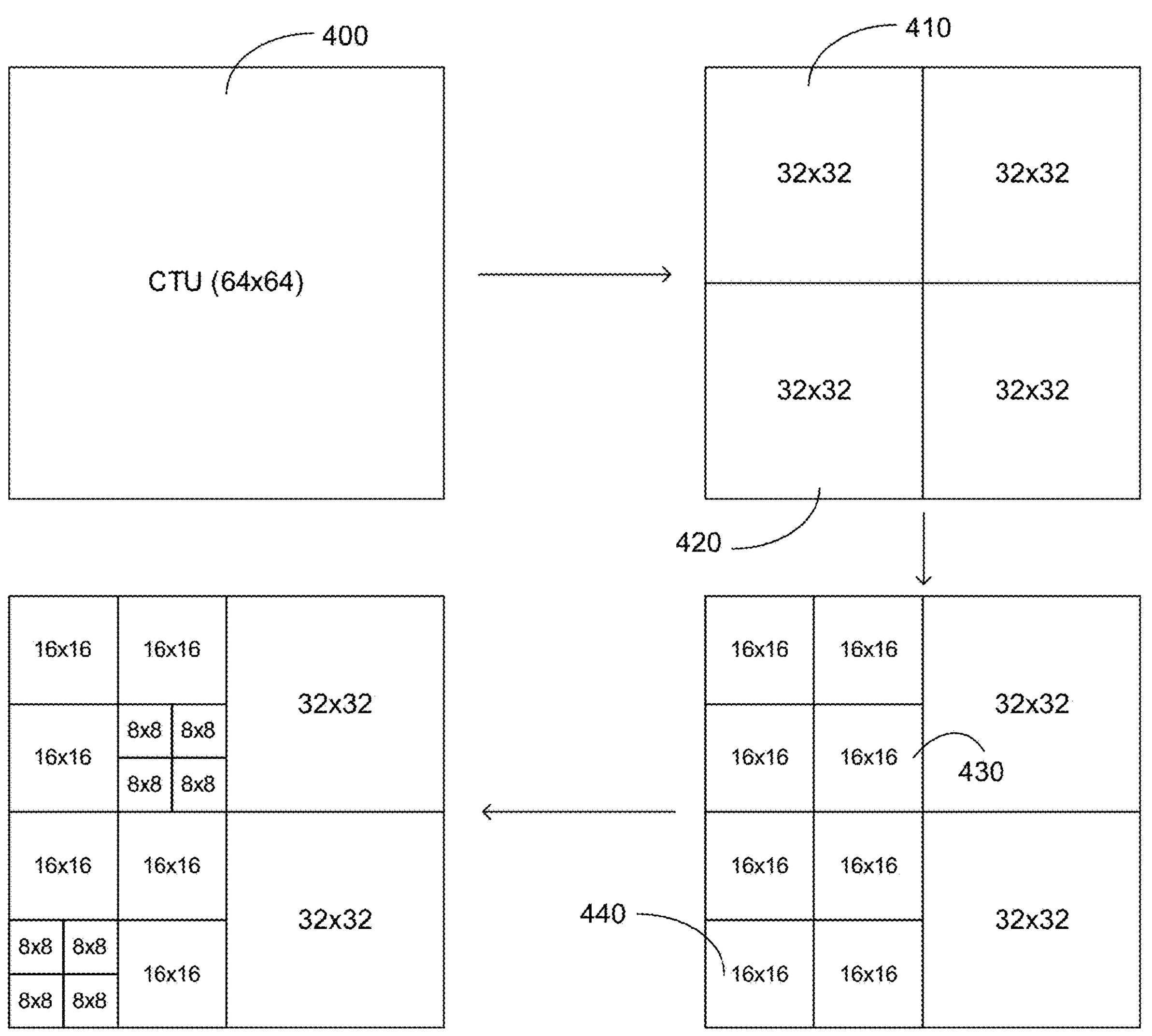
Figure 1G:
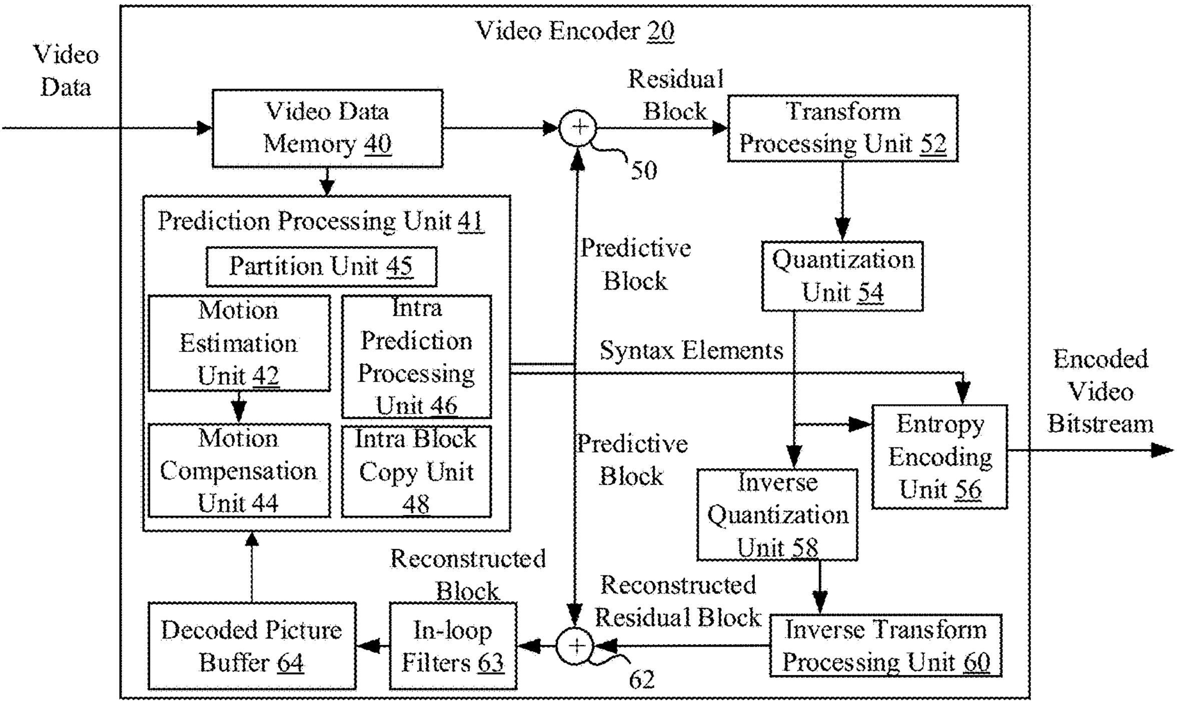
FIG. 1G is a block diagram illustrating an exemplary video encoder in accordance with some examples of the present disclosure

FIG. 1G is a block diagram illustrating another exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 1G, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove blockiness artifacts from reconstructed video. Another in-loop filter, such as Sample Adaptive Offset (SAO) filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1A. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 1G, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning or Triple-Tree (TT) partitioning or any combination thereof. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g., a Coding Tree Block (CTB), a Coding Block (CB), a Prediction Block (PB) or a Transform Block (TB) and/or to a sub-block.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a video block within a current video frame or picture relative to a predictive block within a reference frame relative to the current block being coded within the current frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma component differences or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or a different frame according to inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more TUs and is provided to the transform processing unit 52. The transform processing unit 52 transforms the residual video data into residual transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding or another entropy encoding methodology or technique. The encoded bitstream may then be transmitted to the video decoder 30 as shown in FIG. 1A, or archived in the storage device 32 as shown in FIG. 1A for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

FIG. 2B is a block diagram illustrating another exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 1G. For example, the motion compensation unit 82 may generate prediction data based on motion vectors received from the entropy decoding unit 80, while the intra-prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 2B. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 such as deblocking filter, SAO filter and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1A.

In the current VVC and AVS3 standards, motion information of the current coding block is either copied from spatial or temporal neighboring blocks specified by a merge candidate index or obtained by explicit signaling of motion estimation. The focus of the present disclosure is to improve the accuracy of the motion vectors for affine merge mode by improving the derivation methods of affine merge candidates. To facilitate the description of the present disclosure, the existing affine merge mode design in the VVC standard is used as an example to illustrate the proposed ideas. Please note that though the existing affine mode design in the VVC standard is used as the example throughout the present disclosure, to a person skilled in the art of modern video coding technologies, the proposed technologies can also be applied to a different design of affine motion prediction mode or other coding tools with the same or similar design spirit.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

As shown in FIG. 1C, the video encoder 20 (or more specifically a partition unit in a prediction processing unit of the video encoder 20) generates an encoded representation of a frame by first partitioning the frame into a set of CTUs. A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 1D, each CTU may include one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may include a single coding tree block and syntax elements used to code the samples of the coding tree block. A coding tree block may be an N×N block of samples.

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 1E, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 1F depicts a quad-tree data structure illustrating the end result of the partition process of the CTU 400 as depicted in FIG. 1E, each leaf node of the quad-tree corresponding to one CU of a respective size ranging from 32×32 to 8×8. Like the CTU depicted in FIG. 1D, each CU may include a CB of luma samples and two corresponding coding blocks of chroma samples of a frame of the same size, and syntax elements used to code the samples of the coding blocks. In monochrome pictures or pictures having three separate color planes, a CU may include a single coding block and syntax structures used to code the samples of the coding block. It should be noted that the quad-tree partitioning depicted in FIGS. 1E-1F is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIGS. 3A-3G, there are seven possible partitioning types of a coding block having a width W and a height H, i.e., quaternary partitioning, horizontal binary partitioning, vertical binary partitioning, horizontal ternary partitioning, vertical ternary partitioning, vertical extended ternary partitioning and horizontal extended ternary partitioning.

In some implementations, the video encoder 20 may further partition a coding block of a CU into one or more M×N PBs. A PB is a rectangular (square or non-square) block of samples on which the same prediction, inter or intra, is applied. A PU of a CU may include a PB of luma samples, two corresponding PBs of chroma samples, and syntax elements used to predict the PBs. In monochrome pictures or pictures having three separate color planes, a PU may include a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 1E, the video encoder 20 may use quad-tree partitioning to decompose the luma, Cb, and Cr residual blocks of a CU into one or more luma, Cb, and Cr transform blocks respectively. A transform block is a rectangular (square or non-square) block of samples on which the same transform is applied. A TU of a CU may include a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Ch coefficient block or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may entropy encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that forms a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding, into the video bitstream, an actual motion vector of the current CU determined by the motion estimation unit as described above in connection with FIG. 1B, the motion vector predictor of the current CU is subtracted from the actual motion vector of the current CU to produce a Motion Vector Difference (MVD) for the current CU. By doing so, there is no need to encode the motion vector determined by the motion estimation unit for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30 and an index of the selected motion vector predictor within the motion vector candidate list is sufficient for the video encoder 20 and the video decoder 30 to use the same motion vector predictor within the motion vector candidate list for encoding and decoding the current CU.

Deblocking Filter

Deblocking filtering process is similar to those in HEVC. In VVC, the deblocking filtering process is applied on a CU boundaries, transform subblock boundaries and prediction subblock boundaries. The prediction subblock boundaries include the prediction unit boundaries introduced by the SbTMVP and affine modes, and the transform subblock boundaries include the transform unit boundaries introduced by SBT and ISP modes, and transforms due to implicit split of large CUs. As done in HEVC, the processing order of the deblocking filter is defined as horizontal filtering for vertical edges for the entire picture first, followed by vertical filtering for horizontal edges. This specific order enables either multiple horizontal filtering or vertical filtering processes to be applied in parallel threads, or can still be implemented on a CTB-by-CTB basis with only a small processing latency. Compared to HEVC deblocking, the following modifications are introduced: the filter strength of the deblocking filter dependent of the averaged luma level of the reconstructed samples; deblocking tC table extension and adaptation to 10-bit video; 4×4 grid deblocking for luma; stronger deblocking filter for luma; stronger deblocking filter for chroma; deblocking filter for subblock boundary; and deblocking decision adapted to smaller difference in motion.

Sample Adaptive Offset

In VVC, sample adaptive offset technique is inherited from HEVC. SAO may use different offsets sample by sample in a region depending on the sample classification, and SAO parameters are adapted from region to region. Two SAO types that can satisfy the requirements of low complexity are adopted in HEVC: edge offset (EO) and band offset (BO). For EO, the sample classification is based on comparison between current samples and neighboring samples. For BO, the sample classification is based on sample values. Please note that each color component may have its own SAO parameters. To achieve low encoding latency and to reduce the buffer requirement, the region size is fixed to one CTB. To reduce side information, multiple CTUs can be merged together to share SAO parameters.

Adaptive Loop Filter

In VVC, an Adaptive Loop Filter (ALF) with block-based filter adaption is applied. For the luma component, one among 25 filters is selected for each 4×4 block, based on the direction and activity of local gradients.

Figure 5A:
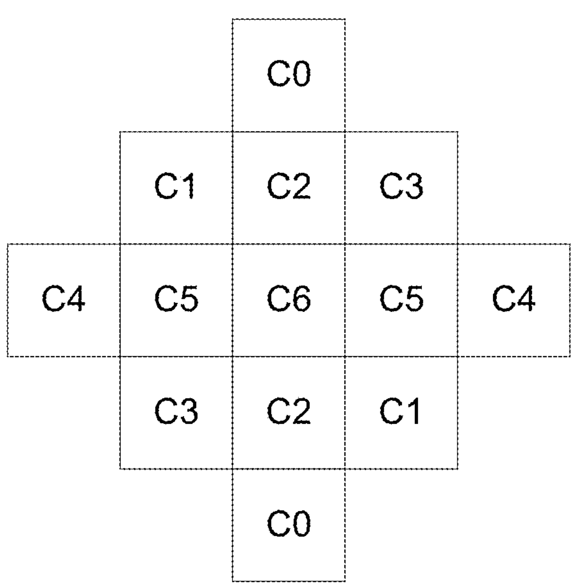
FIG. 5A is a block diagram illustrating a 5×5 diamond shape of ALF filter applied for chroma component in accordance with some examples of the present disclosure.
Figure 5B:
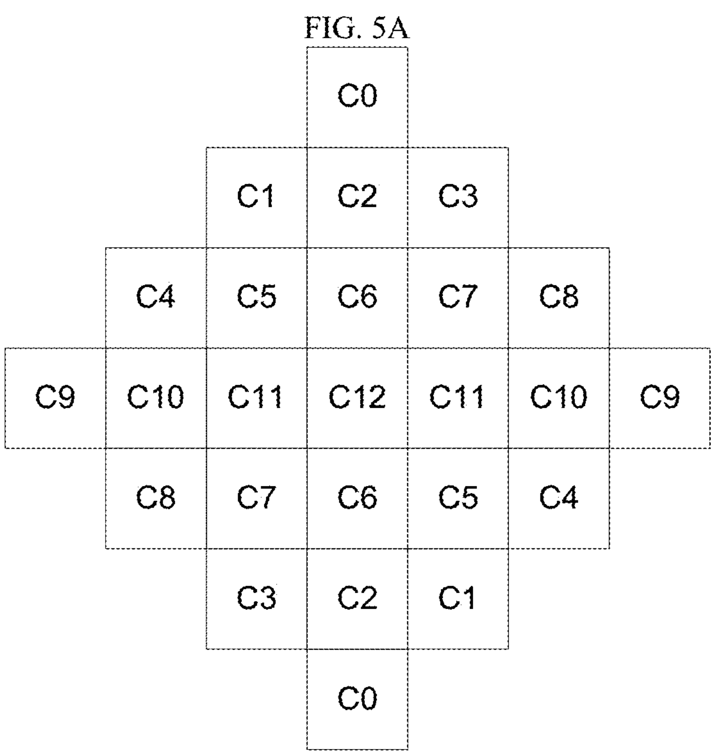
FIG. 5B is a block diagram illustrating a 7×7 diamond shape of ALF filter applied for luma component in accordance with some examples of the present disclosure.

Two diamond filter shapes, as shown in FIGS. 5A and 5B are used. The 7×7 diamond shape is applied for luma component as shown in FIG. 5B and the 5×5 diamond shape is applied for chroma components as shown in FIG. 5A.

For luma component, each 4×4 block is categorized into one out of 25 classes. The classification index C is derived based on its directionality D and a quantized value of activity Â, as follows:

$$C = 5D + \hat{A} \tag{1}$$

To calculate D and Â, gradients of the horizontal, vertical and two diagonal directions are first calculated using 1-D Laplacian:

$$g_v = \sum_{k=i-2}^{i+3} \sum_{l=j-2}^{j+3} V_{k,l},\ V_{k,l} = |2R(k,l) - R(k,l-1) - R(k,l+1)| \tag{2}$$

$$g_h = \sum_{k=i-2}^{i+3} \sum_{l=j-2}^{j+3} H_{k,l},\ H_{k,l} = |2R(k,l) - R(k-1,l) - R(k+1,l)| \tag{3}$$

$$g_{d1} = \sum_{k=i-2}^{i+3} \sum_{l=j-3}^{j+3} D1_{k,l},\quad D1_{k,l} = |2R(k,l) - R(k-1,l-1) - R(k+1,l+1)| \tag{4}$$

$$g_{d2} = \sum_{k=i-2}^{i+3} \sum_{j=j-2}^{j+3} D2_{k,l},\quad D2_{k,l} = |2R(k,l) - R(k-1,l+1) - R(k+1,l-1)| \tag{5}$$

Where indices i and j refer to the coordinates of the upper left sample within the 4×4 block and R(i, j) indicates a reconstructed sample at coordinate (i, j).

To reduce the complexity of block classification, the subsampled 1-D Laplacian calculation is applied. As shown in FIGS. 6A-6D, the same subsampled positions are used for gradient calculation of all directions.

Then maximum and minimum values of the gradients of horizontal and vertical directions are set as:

$$g_{h,v}^{max} = \max(g_h, g_v),\ g_{h,v}^{min} = \min(g_h, g_v) \tag{6}$$

The maximum and minimum values of the gradient of two diagonal directions are set as:

$$g_{d0,d1}^{max} = \max(g_{d0}, g_{d1}),\ g_{d0,d1}^{min} = \min(g_{d0}, g_{d1}) \tag{7}$$

To derive the value of the directionality D, these values are compared against each other and with two thresholds $t_1$ and $t_2$:

Step 1. If both $$g_{h,v}^{max} \le t_1 \cdot g_{h,v}^{min} \text{ and } g_{d0,d1}^{max} \le t_1 \cdot g_{d0,d1}^{min}$$

are true, D is set to 0.

Step 2. If $$g_{h,v}^{max} / g_{h,v}^{min} > g_{d0,d1}^{max} / g_{d0,d1}^{min},$$

continue from Step 3; otherwise continue from Step 4.

Step 3. If $$g_{h,v}^{max} > t_2 \cdot g_{h,v}^{min},$$

D is set to 2; otherwise D is set to 1.

Step 4. If $$g_{d0,d1}^{max} > t_2 \cdot g_{d0,d1}^{min},$$

D is set to 4; otherwise D is set to 3.

The activity value A is calculated as:

$$A = \sum_{k=i-2}^{i+3} \sum_{l=j-2}^{j+3} (V_{k,l} + H_{k,l}) \quad (8)$$

A is further quantized to the range of 0 to 4, inclusively, and the quantized value is denoted as Â. For chroma components in a picture, no classification method is applied.

Before filtering each 4×4 luma block, geometric transformations such as rotation or diagonal and vertical flipping are applied to the filter coefficients ƒ(k, l) and to the corresponding filter clipping values c(k, l) depending on gradient values calculated for that block. This is equivalent to applying these transformations to the samples in the filter support region. The idea is to make different blocks to which ALF is applied more similar by aligning their directionality. Three geometric transformations, including diagonal, vertical flip and rotation are introduced:

$$\text{Diagonal: } f_D(k, l) = f(l, k),\ c_D(k, l) = c(l, k), \quad (9)$$

$$\text{Vertical flip: } f_V(k, l) = f(k, K-l-1),\ c_V(k, l) = c(k, K-l-1) \quad (10)$$

$$\text{Rotation: } f_R(k, l) = f(K-l-1, k),\ c_R(k, l) = c(K-l-1, k) \quad (11)$$

where K is the size of the filter and 0≤k, l≤K−1 are coefficients coordinates, such that location (0,0) is at the upper left corner and location (K−1, K−1) is at the lower right corner. The transformations are applied to the filter coefficients ƒ(k, l) and to the clipping values c(k, l) depending on gradient values calculated for that block. The relationship between the transformation and the four gradients of the four directions are summarized in the following Table 1.

TABLE 1

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

At decoder side, when ALF is enabled for a CTB, each sample R(i, j) within the CU is filtered, resulting in sample value R'(i, j) as shown below, $$R'(i, j) = R(i, j) + \left(\left(\sum_{k\neq 0} \sum_{l\neq 0} f(k, l) \times K(R(i+k, j+l) - R(i, j), c(k, l)) + 64\right) \gg 7\right) \quad (12)$$

where ƒ(k, l) denotes the decoded filter coefficients, K(x, y) is the clipping function and c(k, l) denotes the decoded clipping parameters. The variables k and l vary between $$-\frac{L}{2} \text{ and } \frac{L}{2}$$

where L denotes the filter length. The clipping function K(x, y)=min(y, max(−y, x)) which corresponds to the function Clip3 (−y, y, x). The clipping operation introduces non-linearity to make ALF more efficient by reducing the impact of neighbor sample values that are too different with the current sample value.

Bilateral Filter

Bilateral filtering is one of the typical filtering techniques. For the filter kernel of bilateral filtering, the contribution of each sample depends not only on the spatial distance but also on the difference in intensity between the samples. A sample located at position (i, j) will be filtered using its neighboring sample (k, l). The weight ω(i, j, k, l) is the weight assigned to sample (k, l) for the filtering of sample (i, j), and is defined as:

$$\omega(i, j, k, l) = e^{-\frac{(i-k)^2+(j-l)^2}{2\sigma_d^2} - \frac{(I(i,j)-I(k,l))^2}{2\sigma_r^2}} \quad (13)$$

Where I(i, j) and I(k, l) are the intensity value of sample (i, j) and (k, l), respectively. The strength of the bilateral filter is controlled by $\sigma_d$ (spatial strength) and $\sigma_r$ (intensity strength). The output sample is the weighted average of the samples inside the filtering window.

In ECM, there are three in-loop filtering modules, including de-blocking filter (DBF), sample adaptive offset (SAO) and adaptive loop filter (ALF). During the development of VVC, bilateral filter is initially proposed to refine the reconstruction after inverse transform. Later, the bilateral filter technique is extended to be a part of in-loop filtering in the ECM, which can be utilized jointly with SAO, as described by the following equation. Each filter creates an offset per sample, and these are added to the input sample and then clipped, before proceeding to ALF.

$$I_{OUT} = \text{clip3}(I_C + \Delta I_{BIF} + \Delta I_{SAO}) \quad (14)$$

where $I_C$ is the input sample from deblocking, $\Delta I_{BIF}$ is the offset from the bilateral filter and $\Delta I_{SAO}$ is the offset from SAO. The current implementation of bilateral filtering in the ECM provides the possibility for the encoder to enable or disable filtering at the CTU and slice level. The encoder takes a decision by evaluating the RDO cost.

Following Table 2, Table 3 and Table 4 provide the picture parameter set RBSP syntax, slice header syntax and coding tree unit syntax for bilateral filter, respectively.

TABLE 2

Picture parameter set RBSP syntax for bilateral filter

| | Descriptor |
|---|---|
| pic_parameter_set_rbsp( ) { | |
| ... | |
| pps_bilateral_filter_enabled_flag | u(1) |
| if( pps_bilateral_filter_enabled_flag) { | |
| bilateral_filter_strength | u(2) |
| bilateral_filter_qp_offset | se(v) |
| } | |

pps_bilateral_filter_enabled_flag equal to 0 specifies that the bilateral loop filter is disabled for slices referring to the PPS. pps_bilateral_filter_enabled_flag equal to 1 specifies that the bilateral loop filter is enabled for slices referring to the PPS.

bilateral_filter_strength specifies a bilateral loop filter strength value used in the bilateral transform block filter process. The value of bilateral_filter_strength shall be in the range of 0 to 2, inclusive.

bilateral_filter_qp_offset specifies an offset used in the derivation of the bilateral filter look-up table, LUT(x), for slices referring to the PPS. bilateral_filter_qp_offset shall be in the range of −12 to +12, inclusive.

TABLE 3

Slice header syntax for bilateral filter

| | Descriptor |
|---|---|
| slice_header( ) { | |
| ... | |
| if( pps_bilateral_filter_enabled_flag ) { | |
| slice_bilateral_filter_all_ctb_enabled_flag | u(1) |
| if( !slice_bilateral_filter_all_ctb_enabled_flag ) | |
| slice_bilateral_filter_enabled_flag | u(1) |
| } | |

TABLE 4

Coding tree unit syntax for bilateral filter

| | Descriptor |
|---|---|
| coding_tree_unit( ) { | |
| ... | |
| if( !slice_bilateral_filter_all_ctb_enabled_flag && slice_bilateral_filter_enabled_flag ) | |
| bilateral_filter_ctb_flag[ xCtb >> CtbLog2SizeY ][ yCtb >> CtbLog2SizeY ] | u(1) |

slice_bilateral_filter_all_ctb_enabled_flag equal to 1 specifies that the bilateral filter is enabled and is applied to all CTBs in the current slice. When slice_bilateral_filter_all_ctb_enabled_flag is not present, it is inferred to be equal to 0.

slice_bilateral_filter_enabled_flag equal to 1 specifies that the bilateral filter is enabled and may be applied to CTBs of the current slice. When slice_bilateral_filter_enabled_flag is not present, it is inferred to be equal to slice_bilateral_filter_all_ctb_enabled_flag.

bilateral_filter_ctb_flag[xCtb>>Ctb Log 2SizeY] [yCtb>>Ctb Log 2SizeY] equal to 1 specifies that the bilateral filter is applied to the luma coding tree block of the coding tree unit at luma location (xCtb, yCtb). bilateral_filter_ctb_flag[xCtb>>Ctb Log 2SizeY][yCtb>>Ctb Log 2SizeY] equal to 0 specifies that the bilateral filter is not applied to the luma coding tree block of the coding tree unit at luma location (xCtb, yCtb). When bilateral_filter_ctb_flag is not present, it is inferred to be equal (slice_bilateral_filter_all_ctb_enabled_flag & slice_bilateral_filter_enabled_flag).

For CTUs that are filtered, the filtering process proceeds as follows. At the picture border, where samples are unavailable, the bilateral filter uses extension (sample repetition) to fill in unavailable samples. For virtual boundaries, the behavior is the same as for SAO, i.e., no filtering occurs. When crossing horizontal CTU borders, the bilateral filter can access the same samples as SAO is accessing. As an example, if the center sample $I_C$ (see FIG. 13) is located on the top line of a CTU, $I_{NW}$, $I_A$ and $I_{NE}$ are read from the CTU above, just like SAO does, but $I_{AA}$ is padded, so no extra line buffer is needed.

Figure 13:
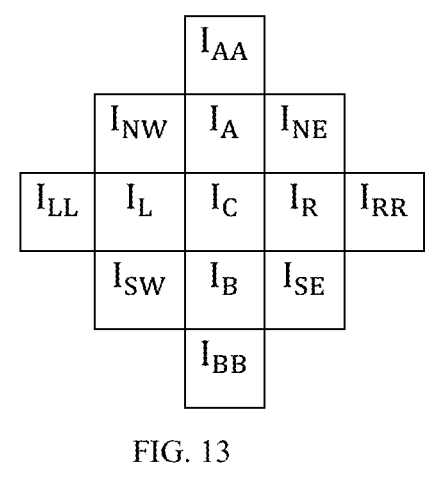

The samples surrounding the center sample $I_C$ are denoted according to FIG. 13, where A, B, L and R stands for above, below, left and right and where NW, NE, SW, SE stands for north-west etc. Likewise, AA stands for above-above, BB for below-below etc.

Each surrounding sample $I_A$, $I_R$ etc will contribute with a corresponding modifier value $\mu_{\Delta I_A}$, $\mu_{\Delta I_R}$, etc. These are calculated the following way: Starting with the contribution from the sample to the right, $I_R$, we calculate the difference $$\Delta I_R = (|I_R - I_C| + 4) \gg 3, \tag{15}$$

where |•| denotes absolute value. For data that is not 10-bit, we instead use $\Delta I_R = (|I_R - I_C| + 2^{n-6}) >> (n-7)$, where n=8 for 8-bit data etc. The resulting value is now clipped so that it is smaller than 16:

$$sI_R = \min(15, \Delta I_R). \tag{16}$$

The modifier value is now calculated as $$\mu_{\Delta I_R} = \begin{cases} LUT_{ROW}[sI_R] & \text{if } I_R - I_C \geq 0, \\ -LUT_{ROW}[sI_R] & \text{otherwise} \end{cases} \tag{17}$$

where $LUT_{ROW}[\ ]$ is an array of 16 values determined by the value of qpb=clip(0, 25, QP+bilateral_filter_qp_offset−17).

The modifier values for $\mu_{\Delta I_L}$, $\mu_{\Delta I_A}$ and $\mu_{\Delta I_B}$ are calculated from $I_L$, $I_A$ and $I_B$ in the same way. For diagonal samples $I_{NW}$, $I_{NE}$, $I_{SE}$, $I_{SW}$, and the samples two steps away $I_{AA}$, $I_{BB}$, $I_{RR}$ and $I_{LL}$, the calculation also follows Equations 3 and 4, but uses a value shifted by 1. Using the diagonal sample $I_{SE}$ as an example:

$$\mu_{\Delta I_{SE}} = \begin{cases} LUT_{ROW}[sI_{SE}] \gg 1, & \text{if } I_{SE} - I_C \geq 0, \\ -(LUT_{ROW}[sI_{SE}] \gg 1) & \text{otherwise} \end{cases} \tag{18}$$

and the other diagonal samples and two-steps-away samples are calculated likewise. The modifier values are summed together $$m_{sum} = \mu_{\Delta I_A} + \mu_{\Delta I_B} + \mu_{\Delta I_L} + \mu_{\Delta I_R} + \mu_{\Delta I_{NE}} + \mu_{\Delta I_{SW}} + \mu_{\Delta I_{SE}} + \mu_{\Delta I_{AA}} + \mu_{\Delta I_{BB}} + \mu_{\Delta I_{LL}} + \mu_{\Delta I_{RR}}. \tag{19}$$

Note that $\mu_{\Delta I_R}$ equals $-\mu_{\Delta I_A}$ for the previous sample. Likewise, $\mu_{\Delta I_A}$ equals $-\mu_{\Delta I_B}$ for the sample above, and similar symmetries can be found also for the diagonal- and two-steps-away modifier values. This means that in a hardware implementation, it is sufficient to calculate the six values $\mu_{\Delta I_R}$, $\mu_{\Delta I_B}$, $\mu_{\Delta I_{SW}}$, $\mu_{\Delta I_{SE}}$, $\mu_{\Delta I_{RR}}$ and $\mu_{\Delta I_{BB}}$ and the remaining six values can be obtained from previously calculated values.

The $m_{sum}$ value is now multiplied either by c=1, 2 or 3, which can be done using a single adder and logical AND gates in the following way:

$$c_v = k_1 \,\&(m_{sum} \ll 1) + k_2 \,\& m_{sum}, \tag{20}$$

where & denotes logical and $k_1$ is the most significant bit of the multiplier c and $k_2$ is the least significant bit. The value to multiply with is obtained using the minimum block dimension D=min(width, height) as shown in Table 5.

TABLE 5

Obtaining the c parameter from the minimum size D = min(width, height) of the block

| Block type | D ≤ 4 | 4 < D < 16 | D ≥ 16 |
|---|---|---|---|
| Intra | 3 | 2 | 1 |
| Inter | 2 | 2 | 1 |

Finally, the bilateral filter offset $\Delta I_{BIF}$ is calculated. For full strength filtering, $$\Delta I_{BIF} = (c_v + 16) \gg 5, \tag{21}$$

whereas for half-strength filtering, we instead use $$\Delta I_{BIF} = (c_v + 32) \gg 6. \tag{22}$$

A general formula for n-bit data is to use $$r_{add} = 2^{14-n-bilateral\_filter\_strength}$$
$$r_{shift} = 15 - n - \text{bilateal\_filter\_strength}$$
$$\Delta I_{BIF} = (c_v + r_{add}) \gg r_{shift}, \tag{23}$$

where bilateral_filter_strength can be 0 or 1 and is signaled in the pps.

Signal Adaptive Diffusion Filter

Diffusion filtering technique is proposed in JVET-J0038, where it is applied to the prediction signal generated by a hybrid video codec. Two types of diffusion filters are proposed: Linear and nonlinear diffusion filters. The linear diffusion filters correlate the extended prediction signal n times using a symmetric filter mask. The nonlinear diffusion filters use the input prediction signal to identify structures of the underlying signal and diffuse along edges rather than perpendicular to them.

General algorithm description. It is proposed that the diffusion filters are applied to the prediction signal pred generated by the underlying codec. The filter may be applied for intra as well as inter predictions. Two types of diffusion filters are proposed: Linear and nonlinear diffusion filters.

Linear Diffusion Filter. Mathematically, the linear diffusion filters are motivated by the following partial differential equation $$\frac{\partial}{\partial t} u(x, t) = div(\nabla u(x, t)),$$
$$u(x, 0) = pred(x), \tag{24}$$

where u denotes the filtered prediction and parameter t denotes time which corresponds to iterations in a discrete setting. The linear diffusion filters are implemented as a symmetric filter mask $$h = \frac{1}{4}\begin{bmatrix} 0 & 1 & 0 \\ 1 & 0 & 1 \\ 0 & 1 & 0 \end{bmatrix} \tag{25}$$

Note that whenever possible, all 2D filter masks are implemented as 1D filters. The filtered prediction $u_n$ is calculated by correlating n times the prediction signal pred with the filter mask h, i.e., by calculating $$u_n = \underbrace{h * \ldots * h}_{n\ times} * pred \tag{26}$$

Figure 7:
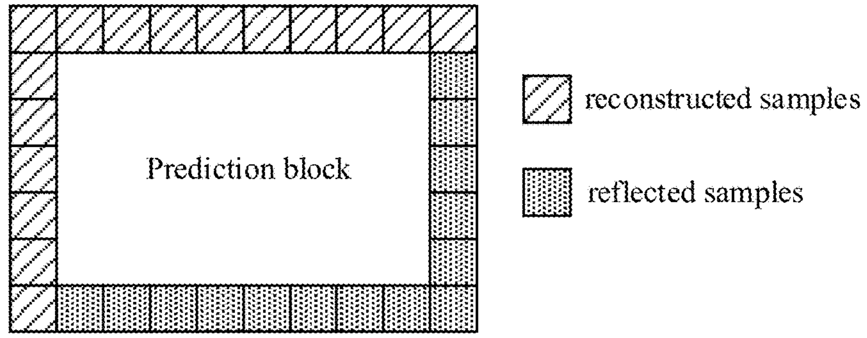
FIG. 7 is a block diagram illustrating extended prediction signal in accordance with some examples of the present disclosure.

Here * denotes the application of the filter mask to the image, also called correlation. At each correlation step, at the right and lower boundary symmetric boundary conditions are assumed while at the top and left boundary equality with the reconstructed samples is assumed as shown in FIG. 7.

In some examples, the number n of iterations is equal to 5 or 15 iteration steps, in case of Inter and to 5 or 35 in case of Intra prediction signals. The more iteration steps are carried out, the smoother the modified prediction will be. In the end, the filtered prediction is used as the modified prediction block.

Nonlinear Diffusion Filter. While the linear diffusion filters smooth edges and smoother areas alike, the idea of the nonlinear diffusion filters is to locate edges using the given prediction signal and reduce the magnitude of diffusion at those locations. The implementation of the nonlinear diffusion filters is motivated by the following nonlinear differential equation $$\frac{\partial}{\partial t} u = div\left(\tilde{f}(J_\rho(J_\rho(\nabla pred(x)))\nabla u\right) \tag{27}$$

with initial and boundary conditions as described above. Here, edges and their directions are detected in terms of the gradient of the initial prediction signal. Therefore, the proposed nonlinear diffusion filter performs n correlations of the prediction signal pred with a mask h(x) that is different at each position $x \in \mathbb{R}^2$ and is computed out of the prediction signal pred as follows.

First, in order to identify edges, a Gaussian-smoothed diffusion tensor $$J_\rho(\nabla pred) := K * \nabla pred\ \nabla pred^T \tag{28}$$

is constructed, with a Gaussian kernel K. The discrete gradient $\nabla pred=(EW, NS)^T$ is calculated using finite differences, namely by $$EW:=\begin{bmatrix}0&0&0\\-1&0&1\\0&0&0\end{bmatrix}*pred \text{ and } NS:=\begin{bmatrix}0&1&0\\0&0&0\\0&-1&0\end{bmatrix}*pred \quad (29)$$

using boundary conditions as described above. That means the gradient components EW and NS are given by simple differences of two sample values.

Then, for each sample location $x\in\mathbb{R}^2$ inside the prediction block area, the 2×2 diffusion tensor is given by $$4\nabla pred(x)\nabla pred(x)^T=\begin{pmatrix}EW(x)\cdot EW(x) & EW(x)\cdot NS(x)\\ EW(x)\cdot NS(x) & NS(x)\cdot NS(x)\end{pmatrix}, \quad (30)$$

where the multiplication dot is understood to be pointwise. The Gaussian kernel is chosen as $$K=\frac{1}{4}\begin{bmatrix}0&1&0\\1&2&1\\0&1&0\end{bmatrix} \quad (31)$$

The Gaussian kernel is applied on the gradient matrices EW·EW, EW·NS and NS·NS. This way, we receive a symmetric 2×2 matrix $$J_\rho(\nabla pred(x))=\frac{1}{4}\begin{pmatrix}g_{xx}&g_{xy}\\g_{xy}&g_{yy}\end{pmatrix}(x)=\frac{1}{4}\begin{pmatrix}((K*(EW\cdot EW))(x) & ((K*(EW\cdot NS))(x)\\((K*(EW\cdot NS))(x) & ((K*(NS\cdot NS))(x)\end{pmatrix} \quad (32)$$

for every $x\in\mathbb{R}^2$ inside the prediction block area.

Secondly, the matrices $J_\rho(\nabla pred(x))$ are diagonalized such that $$\begin{pmatrix}\lambda_1(x)&0\\0&\lambda_2(x)\end{pmatrix}=\begin{pmatrix}\cos(\theta)&-\sin(\theta)\\\sin(\theta)&\cos(\theta)\end{pmatrix}J_\rho(\nabla pred(x))\begin{pmatrix}\cos(\theta)&\sin(\theta)\\-\sin(\theta)&\cos(\theta)\end{pmatrix}, \quad (33)$$

where $\lambda_1(x)$, $\lambda_2(x)$ denote the eigenvalues of $J_\rho(\nabla pred(x))$ and θ represents the associated rotation angle in the coordinate system. Using trigonometric formulas, it can be shown that $$\lambda_1(x)=\frac{1}{4}(g_{xx}(x)-g_{xy}(x)\tan(\theta)) \quad (34)$$

$$\lambda_2(x)=\frac{1}{4}(g_{yy}(x)-g_{xy}(x)\tan(\theta)), \quad (35)$$

where $$\tan(2\theta)=\frac{2g_{xy}(x)}{g_{yy}(x)g_{xx}(x)}$$

The determination of the eigenvalues $\lambda_1$, $\lambda_2$ is implemented using integer look-up tables. For that purpose, with a and b representing the rounded integers $$a=\left[256\cdot\frac{2g_{xy}}{g_{yy}-g_{xx}}\right] \text{ and } b=\left[256\cdot\frac{g_{yy}-g_{xx}}{2g_{xy}}\right] \quad (36)$$

the following expressions are tabulated for a=0 . . . 256 and b=0 . . . 256

$$tab_1[a]=\left[256\cdot\cos\left(0.5\cdot\operatorname{atan}\left(\frac{a}{256}\right)\right)^2\right]$$

$$tab_2[a]=\left[256\cdot\cos\left(0.5\cdot\operatorname{atan}\left(\frac{a}{256}\right)\right)\cdot\sin\left(0.5\cdot\tan\left(\frac{a}{256}\right)\right)\right]$$

$$tab_3[a]=\left[256\cdot\sin\left(0.5\cdot\operatorname{atan}\left(\frac{a}{256}\right)\right)^2\right]$$

$$tab_4[b]=\left[256\cdot\cos\left(0.5\cdot\operatorname{atan}\left(\frac{256}{b}\right)\right)^2\right]$$

$$tab_5[b]=\left[256\cdot\cos\left(0.5\cdot\operatorname{atan}\left(\frac{256}{b}\right)\right)\cdot\sin\left(0.5\cdot\operatorname{atan}\left(\frac{256}{b}\right)\right)\right]$$

$$tab_6[b]=\left[256\cdot\sin\left(0.5\cdot\operatorname{atan}\left(\frac{256}{b}\right)\right)^2\right]$$

where the square brackets [ ] specify rounding to the next integer.

Next, a function ƒ is applied to the eigenvalues $\lambda_1$, $\lambda_2$ of $J_\rho(\nabla pred)$ which serves as an edge detector: if eigenvalues $\lambda_1$, $\lambda_2$ are large, i.e. an edge is indicated, function ƒ will be small. Function ƒ is chosen in case of intra as an approximation of $$f(s)=\exp\left(\frac{-s}{\mu}\right),$$

and in case of inter as $$f(s)=1\Big/\left(1+\frac{s}{\mu}\right)$$

with parameter μ>0. In the implementation, the factor ¼ can be incorporated into function ƒ. The Parameter μ is a fixed value given by $$\mu=\begin{cases}200, & \text{for intra prediction}\\64, & \text{for inter prediction and } QP<33\\550, & \text{for inter prediction and } QP\geq 33\end{cases} \quad (37)$$

The two functions ƒ(s) are tabulated using integer tables.

After applying the function ƒ, the matrix is retransformed $$\tilde{f}(J_\rho(\nabla pred(x))):=\begin{pmatrix}\cos(\theta)&\sin(\theta)\\-\sin(\theta)&\cos(\theta)\end{pmatrix}\begin{pmatrix}f(\lambda_1)&0\\0&f(\lambda_2)\end{pmatrix}\begin{pmatrix}\cos(\theta)&-\sin(\theta)\\\sin(\theta)&\cos(\theta)\end{pmatrix}=:\begin{pmatrix}a_{xx}&a_{xy}\\a_{xy}&a_{yy}\end{pmatrix}(x) \quad (38)$$

Using this sample-wise definition, three functions $a_{xx}$, $a_{xy}$, $a_{yy}$ are defined with an entry for each sample location $x\in\mathbb{R}^2$ inside the prediction block area. Similarly, as described above the rotation of the 2×2 matrix is implemented using the look-up tables given above.

Given the arrays $a_{xx}(x)$, $a_{xy}(x)$, $a_{yy}(x)$ for each sample location $x\in\mathbb{R}^2$, the following 8 arrays are derived using a simple averaging of two neighboring samples:

$$wN := \frac{1}{2}\begin{bmatrix} 0 & 1 & 0 \\ 0 & 1 & 0 \\ 0 & 0 & 0 \end{bmatrix} * a_{yy}$$

$$wS := \frac{1}{2}\begin{bmatrix} 0 & 0 & 0 \\ 0 & 1 & 0 \\ 0 & 1 & 0 \end{bmatrix} * a_{yy}$$

$$wW := \frac{1}{2}\begin{bmatrix} 0 & 0 & 0 \\ 1 & 1 & 0 \\ 0 & 0 & 0 \end{bmatrix} * a_{xx}$$

$$wE := \frac{1}{2}\begin{bmatrix} 0 & 0 & 0 \\ 0 & 1 & 1 \\ 0 & 0 & 0 \end{bmatrix} * a_{xx}$$

$$wO1 := \frac{1}{4}\begin{bmatrix} 0 & 1 & 0 \\ 0 & 0 & 1 \\ 0 & 0 & 0 \end{bmatrix} * a_{xy}$$

$$wO2 := \frac{1}{4}\begin{bmatrix} 0 & 0 & 0 \\ 0 & 0 & 1 \\ 0 & 1 & 0 \end{bmatrix} * a_{xy}$$

$$wO3 := \frac{1}{4}\begin{bmatrix} 0 & 1 & 0 \\ 1 & 0 & 0 \\ 0 & 0 & 0 \end{bmatrix} * a_{xy}$$

$$wO4 := \frac{1}{4}\begin{bmatrix} 0 & 0 & 0 \\ 1 & 0 & 0 \\ 0 & 1 & 0 \end{bmatrix} * a_{xy}$$

The integer weighting matrices wN, wS, wW, wE, wO1, wO2, wO3, wO4 are calculated at the beginning of the non-linear diffusion filter process. These matrices are used for the actual filtering in the iteration steps. For summarizing the approach, the integer weighting matrices are derived by the following ordered steps:

1) Calculate discrete samples differences EW(x) and NS(x)
2) Calculate products (EW·EW)(x), (EW·NS)(x), (NS·NS)(x)
3) Filter the three products with a 5-tap filter kernel for obtaining the gradient arrays $g_{xx}(x)$, $g_{xy}(x)$, and $g_{yy}(x)$
4) Determine the eigenvalues $\lambda_1(x)$, $\lambda_2(x)$ using look-up tables
5) Apply a function $f(s)$ to the eigenvalues using pre-defined look-up tables
6) Derive the integer arrays $a_{xx}$ (x), $a_{xy}$ (x), and $a_{yy}$ (x) using look-up tables
7) Derive the integer weighting arrays wN, wS, wW, wE, wO1, wO2, wO3, and wO4 using sample averages.

Given the arrays wN, wS, wW, wE, wO1, wO2, wO3, and wO4 for the sample locations $x \in \mathbb{R}^2$, the iterative filtering proceeds as follows. Let $u_0$=pred represent the initial luma prediction signal. In each iteration step, the signal u is modified according to $$u_{t+1} = u_t + \frac{1}{4}\left(wO1\cdot\left(\begin{bmatrix} 0 & 0 & 1 \\ 0 & 0 & 0 \\ 0 & 0 & 0 \end{bmatrix} * u_t\right) - wO2\cdot\left(\begin{bmatrix} 0 & 0 & 0 \\ 0 & 0 & 0 \\ 0 & 0 & 1 \end{bmatrix} * u_t\right) - wO3\cdot\left(\begin{bmatrix} 1 & 0 & 0 \\ 0 & 0 & 0 \\ 0 & 0 & 0 \end{bmatrix} * u_t\right) + wO4\cdot\left(\begin{bmatrix} 0 & 0 & 0 \\ 0 & 0 & 0 \\ 1 & 0 & 0 \end{bmatrix} * u_t\right) + wN\cdot\left(\begin{bmatrix} 0 & 1 & 0 \\ 0 & -1 & 0 \\ 0 & 0 & 0 \end{bmatrix} * u_t\right) + wW\cdot\left(\begin{bmatrix} 0 & 0 & 0 \\ 1 & -1 & 0 \\ 0 & 0 & 0 \end{bmatrix} * u_t\right) + wE\cdot\left(\begin{bmatrix} 0 & 0 & 0 \\ 0 & -1 & 1 \\ 0 & 0 & 0 \end{bmatrix} * u_t\right) + wS\cdot\left(\begin{bmatrix} 0 & 0 & 0 \\ 0 & -1 & 0 \\ 0 & 1 & 0 \end{bmatrix} * u_t\right)\right) \quad (39)$$

where the multiplication dot and the summation are to be understood pointwise. Mapping $u_{t+1}$ denotes the filtered prediction after t+1 iteration steps. This way, diffusion along edges is preferred over diffusion perpendicular to them. The nonlinear filter is applied to the prediction for two different amounts of iteration steps which corresponds to two non-linear diffusion filter modes from which the encoder can choose. In case of Intra, it is proposed that the encoder can choose between 5 and 20 iteration steps and for Inter between 4 and 8 as depicted in Table 3 below. In the end, the filtered prediction u is used as the modified prediction block.

Nonlocal Mean Filter

Nonlocal mean filtering technique is firstly proposed in the image de-noising field, which is illustrated in FIG. 9. The to-be-filtered image is denoted as/For each to-be-filtered pixel p[i], the filtered pixel is computed as a weighted average of all the pixels in the image:

$$q[i] = \sum_{j \in I} \omega[i, j] * p[j]$$

where the weighting factor depends on the similarity between pixels p[i] and p[j]. The similarity between two pixels p[i] and p[j] depends on the similarity of the windows which are centered at pixel p[i] and p[j], which are denoted as B[i] and B[j]. The weighting factor is calculated as follows:

$$\omega[i, j] = \frac{1}{Z[i]} e^{-\frac{D(B[i], B[j])}{h^2}}$$

where D{,} is used to measure the distance between two blocks, h is used as the degree of filtering and Z[i] is the normalization constant:

$$Z[i] = \sum_{j \in I} e^{-\frac{D(B[i], B[j])}{h^2}}$$

Nonlocal Structure-Based Loop Filter

Non-local structure-based loop filter (NLSF) was firstly introduced in JVET-J0011 and then refined in JVET-J0071. The NLSF design in J0011 contains two modules: group construction by block matching and SVD-based filtering. The collaborative filtering is achieved by iterative singular value decomposition (SVD) that calculates the singular values with their singular vectors by iterative power method whose internal data type utilizes double precision float-point representation. To adapt the video coding standard as well as being hardware friendly, it is proposed to addresses this issue by eliminating the double precision values via the decimal digits clipping after shifting the intermediate results to large numbers during iterations in JVET-J0071.

Figure 8:
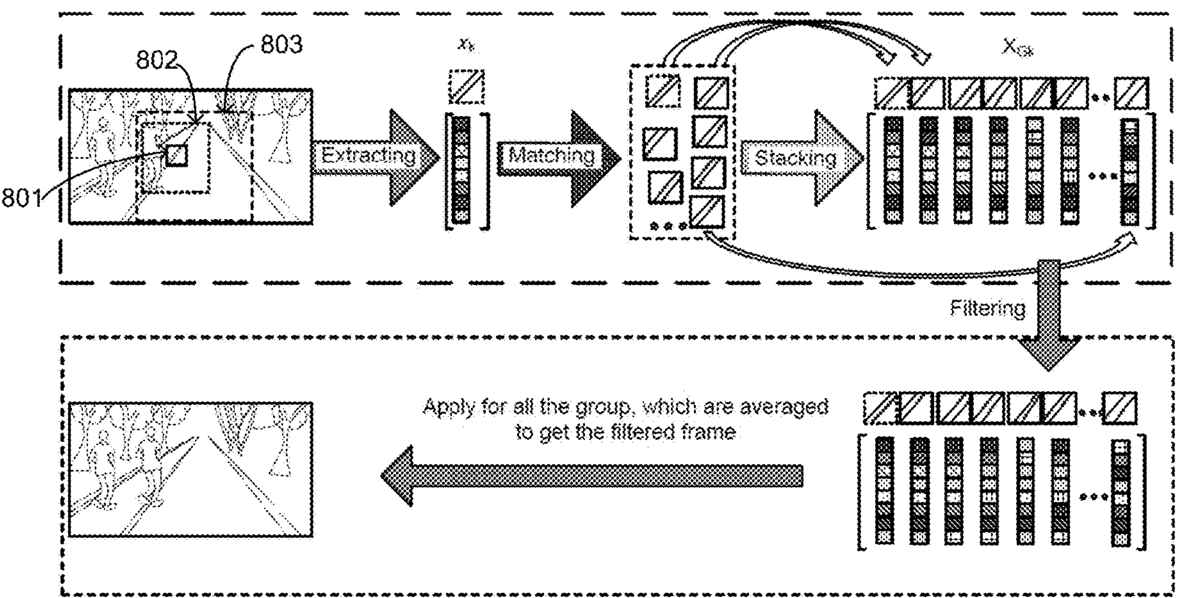
FIG. 8 illustrates nonlocal structure-based filter in accordance with some examples of the present disclosure.

Group construction by block matching. As illustrated in FIG. 8, the input reconstructed frame is firstly divided into K overlapped blocks, and each block serves as the basic loop unit. Let $B_s \times B_s$ denote the size of loop unit, which is set to 6 by default. For each loop unit, it is stretched as a vector $x_k \in \mathcal{R}^{B_s \times B_s}$, k=1, 2, . . . , K. Then, for each block $x_k$, no more than c (defaulted to 20) similar blocks are collected within the corresponding search window to construct the block group. As the example of FIG. 8, the square 801 represents the current loop unit, meanwhile the square 802 denotes the search window and the square 803 denotes the CTU current block located in. m is used to represent the number of similar blocks selected in block matching process. After block matching process, all the similar blocks selected are stacked into a matrix of size $B_s^2 \times m$, denoted by $X_{G_k}$, where each column of the matrix corresponds to one block, i.e., $X_{G_k} = [x_{G_k \otimes 1}, x_{G_k \otimes 2}, \ldots, x_{G_k \otimes m}]$.

SVD-based Filtering. For each group $X_{G_k} = [x_{G_k \otimes 1}, x_{G_k \otimes 2}, \ldots, x_{G_k \otimes m}]$, k=1, 2, . . . , K, it is decomposed by SVD as follows, $$X_{G_k} = U_{G_k} \sum\nolimits_{G_k} V_{G_k}^T = \sum\nolimits_{i=1}^{m} \gamma_{x_{G_k \otimes i}} (u_{G_k \otimes i} v_{G_k \otimes i}^T) \tag{40}$$

$$\text{where } \gamma_{x_{G_k}} = \left[\gamma_{x_{G_{k \otimes 1}}}; \gamma_{x_{G_{k \otimes 2}}}; \ldots; \gamma_{x_{G_{k \otimes m}}}\right]$$

is a column vector, $$\Sigma_{G_k} = \mathrm{diag}\left(\gamma_{x_{G_k}}\right)$$

is a diagonal matrix with the elements of $$\gamma_{x_{G_k}}$$

on its main diagonal, and $u_{G_k \otimes i}$, $v_{G_k \otimes i}$ are the columns of $u_{G_k}$ and $V_{G_k}$, separately. To suppress the compression noise, the hard thresholding operation is applied to the singular values, $$\gamma_{x_{G_k}}$$

$$\alpha_{G_k} = \mathrm{hard}\left(\gamma_{x_{G_k}}, \tau\right) \tag{41}$$

where hard(x, a)=x⊙1 (abs(x)−a) denotes the operator of hard thresholding and stands for the element-wise product of two vectors. τ denotes the threshold.

As the threshold τ used in hard thresholding process is related to Qstep. The relationship between QP and Qstep for an orthonormal transform is formulated as follow, $$Qstep = 2^{\frac{QP-4}{6}} \tag{42}$$

The relationship between τ and Qstep is linear as follow, $$\tau = (a \times Qstep + b) \times \left(B_s^2 + \sqrt{c}\right) \tag{43}$$

where a and b represent the parameter trained offline. a and b are double type variables.

The filtered image can be reconstructed from the shrunk singular values $\alpha_{G_k}$, and the reconstruction for group $\hat{X}_{G_k}$ can be formulated as, $$\hat{X}_{G_k} = \sum\nolimits_{i=1}^{m} \alpha_{G_k \otimes i} \left(u_{G_k \otimes i} v_{G_k \otimes i}^T\right) \tag{44}$$

This process is applied for all K groups to achieve $\hat{X}_{G_k}$, k=1, 2, . . . , K. At last, all $\hat{X}_{G_k}$ are averaged to get the frame $\hat{x}$.

In the present disclosure, methods and apparatus are provided to exploit nonlocal correlation for in-loop filtering.

Nonlocal Mean Filter. When applying nonlocal mean filtering in video coding, several factors may affect the coding performance, including: number of similar blocks, search range, window size, and filter strength, which are termed as the filtering parameter set of nonlocal mean filters.

In one example of nonlocal mean filtering, it is provided to use Sum Absolute Difference (SAD) when searching similar blocks.

In another example of nonlocal mean filtering, it is provided to use QP-dependent filtering parameter of nonlocal mean filters. That is to say, for different QPs, different {number of similar blocks, search ranges, window sizes, filter strengths} set are used.

In another example of nonlocal mean filtering, in addition to QP in the second embodiment, the filtering parameter set of nonlocal mean filters also depend on coding configurations. That is to say for different coding configurations (intra, low delay and random access), different filtering parameter sets are used.

In another example of nonlocal mean filtering, it is proposed to enable CTU/Slice/Picture-adaptive filtering parameter set for nonlocal mean filters. For each CTU/Slice/Picture, the optimal filtering parameters are determined at the encoder side by rate-distortion optimization, and then the optimal filtering parameters are signaled in the bitstream. One method to determine the filtering parameters is to define a candidate list for each filtering parameter and traverse each candidate at the encoder side to calculate its RD cost.

Nonlocal Low Rank Filter with Soft Thresholding. To improve the coding gain of nonlocal mean filter, the nonlocal correlations are combined with the low rank constraint. After searching the similar blocks, these blocks are organized as a matrix, after which singular value decomposition (SVD) is applied to the matrix. Then the singular values are shrunken with the soft thresholding, followed by the inverse SVD to obtain the filtered picture.

In the nonlocal low rank filtering technique, the filtering process may be divided into the following steps.

Step1. The noisy image is firstly divided into patches of p*p.

Step2. For each patch $y_i$, block matching is used to search the K-nearest neighbors in the current picture and (optionally) the reference picture through a specific measurement, like SAD, SSE or other metrics.

Step3. The K-nearest neighbors of $y_i$ construct the image patch group $G_i$ and are arranged as a matrix:

$$Y_{G_i} = \left[y_{G_i}^{(1)}, y_{G_i}^{(2)}, \ldots, y_{G_i}^{(K)}\right]$$

where $Y_{G_i}$ is a matrix with size of $p^2 \times K$ by arranging every patch in group $G_i$ as a column vector.

Step4. Perform SVD decomposition on the matrix $Y_{G_i}$.

$$SVD(Y_{G_i}) = U_{G_i}\Lambda_{G_i}V_{G_i}^*$$

Step5. Apply soft-thresholding operation on the singular value matrix $\Lambda_{G_i}$.

$$\Lambda_{G_i,\tau} = softTh(\Lambda_{G_i}, \tau)$$

where softTh( ) is a function which shrinks the diagonal elements of $\Lambda_{G_i}$ with the threshold $\tau$. For the k-th diagonal element in $\Lambda_{G_i}$, it is shrunken by the nonlinear function $D_{\tau(k)}$ at level $\tau(k)$:

$$D_{\tau(k)}:\lambda_{k,\tau(k)} = \max(|\lambda_k| - \tau(k), 0)$$

$\Lambda_{G_i,\tau}$ is the matrix composed of the shrunken singular values, $\Delta_{k,\tau(k)}$ at diagonal positions.

Step6. Perform inverse SVD to obtain the filtered patch group.

$$\hat{X}_{G_i} = U_{G_i}\Lambda_{G_i,\tau}V_{G_i}^*$$

One of the key steps is to determine the thresholding values for each diagonal elements in step 5. In the present disclosure, the thresholding values are calculated as follows. The threshold is estimated for each group of image patches with the following equation:

$$\tau_{G_i}(k) = c \times \frac{\sigma_{n,G_i}^2}{\sigma_{x,G_i,k}}$$

where $\sigma_{n,G_i}$ is the standard deviation of compression noise, and $\sigma_{x,G_i,k}$ is the standard deviation of the original image patches in the k-th dimension of SVD space for group $G_i$. The deviation of the original image patches in SVD space is estimated as following.

$$\sigma_{x,G_i,k} = \sqrt{\max\left(\frac{\lambda_{G_i,k}^2}{\min(p^2, K)} - \omega \times \sigma_{n,G_i}^2, 0\right)}$$

Where $$\lambda_{G_i,k}^2$$

is the k-th singular value of $Y_{G_i}$. When $\sigma_{x,G_i,k}$ is zero, the soft-thresholding operation is skipped. In addition, the deviation of compression noise is estimated with the deviation of the reconstructed image patches using a power function which is parameterized with $\alpha$ and $\beta$.

$$\sigma_n = \alpha \times \sigma_y^\beta$$

where $\sigma_y$ is calculated as follows, $$\sigma_y = \frac{1}{K}\sum_{k=0}^{K}\sqrt[2]{\sum_{i=1}^{p^2}\frac{(y_k(i) - \mu_k)^2}{p^2}}, \mu_k = \frac{1}{p^2}\sum_{i=1}^{p^2} y_k(i)$$

Here $y_k(i)$ represents the i-th pixel of image patch vector $y_k$.

In summary, to perform nonlocal low rank filtering, the filtering parameters may include: search range, number of matching blocks, window size for nonlocal search, $\alpha$ and $\beta$ for estimating the deviation of compression noise, $\omega$ for estimating the deviation of the original image patches, and constant c for estimating thresholding values.

In one example of nonlocal low rank filtering, it is provided to use Sum Absolute Difference (SAD) when searching similar blocks.

In another example of nonlocal low rank filtering, it is provided to use QP-dependent filtering parameter of nonlocal mean filters. That is to say, for different QPs, different {blocks numbers, search ranges, window sizes, $\alpha$, $\beta$, $\omega$, c} set are used.

In another example of nonlocal low rank filtering, in addition to QP in the second embodiment, the filtering parameters of nonlocal mean filters also depend on coding configurations. That is to say, for different coding configurations (intra, low delay or random access configurations), and for pictures with different temporal layers, different filtering parameters sets are used.

In another example of nonlocal low rank filtering, it is provided to enable CTU/Slice/Picture-adaptive filtering parameter set for nonlocal low rank filters. For each CTU/Slice/Picture, the optimal filtering parameters are determined at the encoder side by rate-distortion optimization, and then the index indicating the optimal filtering parameters are signaled in the bitstream. One method to determine the filtering parameters is to define a candidate list for each filtering parameter and traverse each candidate at the encoder side to calculate its RD cost. The parameter set which leads to minimum RD cost is selected as the final parameter set.

Classification-Based Nonlocal Filtering

Due to the diversity of video content, the statistics of different videos may vary a lot for different patches in the same picture. To further improve the compression performance of nonlocal filtering, the image patches are firstly classified into N categories, for different categories, different filtering parameter sets are used.

In one example, it is provided to classify the patches based on but not limited to directionality and activity, as adaptive loop filter in VVC and ECM.

In another example, after dividing all the patches into N categories, for different {category, QP, coding configuration} pairs, separate filtering parameter sets are used for nonlocal mean filters and nonlocal low rank filters.

In another example, for each CTU/Slice/Picture, the optimal filtering parameters are selected from a predefined parameter candidate list at the encoder side by rate-distortion optimization, and then the optimal filtering parameters are signaled in the bitstream. After dividing all the patches into N categories, for different {category, QP, coding configuration} pairs, separate parameters candidate lists are defined and used for each parameter of nonlocal mean filters and nonlocal low rank filters.

Syntax Design. To better improve the coding performance of the nonlocal filters, it is provided to switch the usage of nonlocal filter at multiple granularities.

In some examples, it is provided to turn on/off nonlocal filter at picture level, slice level and CTU level, and the filtering parameters are fixed at both encoder and decoder. Table 6, Table 7 and Table 8 provide the picture parameter set RBSP syntax, slice header syntax and coding tree unit syntax for nonlocal filter, respectively.

TABLE 6

Picture parameter set RBSP syntax for nonlocal filter

| | Descriptor |
|---|---|
| pic_parameter_set_rbsp( ) { | |
| ... | |
| pps_nonlocal_filter_enabled_flag | u(1) |

pps_nonlocal_filter_enabled_flag equal to 0 specifies that the nonlocal loop filter is disabled for slices referring to the PPS. pps_nonlocal_filter_enabled_flag equal to 1 specifies that the nonlocal loop filter is enabled for slices referring to the PPS.

TABLE 7

Slice header syntax for nonlocal filter

| | Descriptor |
|---|---|
| slice_header( ) { | |
| ... | |
| if( pps_bilateral_filter_enabled_flag ) { | |
| slice_nonlocal_filter_all_ctb_enabled_flag | u(1) |
| if( !slice_nonlocal_filter_all_ctb_enabled_flag ) | |
| slice_nonlocal_filter_enabled_flag | u(1) |
| } | |

TABLE 8

Coding tree unit syntax for nonlocal filter

| | Descriptor |
|---|---|
| coding_tree_unit( ) { | |
| ... | |
| if( !slice_nonlocal_filter_all_ctb_enabled_flag && slice_nonlocal_filter_enabled_flag ) | |
| nonlocal_filter_ctb_flag[ xCtb >> CtbLog2SizeY ][ yCtb >> CtbLog2SizeY ] | u(1) |

slice_nonlocal_filter_all_ctb_enabled_flag equal to 1 specifies that the nonlocal filter is enabled and is applied to all CTBs in the current slice. When slice_nonlocal_filter_all_ctb_enabled_flag is not present, it is inferred to be equal to 0.

slice_nonlocal_filter_enabled_flag equal to 1 specifies that the nonlocal filter is enabled and may be applied to CTBs of the current slice. When slice_nonlocal_filter_enabled_flag is not present, it is inferred to be equal to slice_nonlocal_filter_all_ctb_enabled_flag.

nonlocal_filter_ctb_flag[xCtb>>Ctb Log 2SizeY][yCtb>>Ctb Log 2SizeY] equal to 1 specifies that the nonlocal filter is applied to the luma coding tree block of the coding tree unit at luma location (xCtb, yCtb). nonlocal_filter_ctb_flag[xCtb>>Ctb Log 2SizeY][yCtb>>Ctb Log 2SizeY] equal to 0 specifies that the nonlocal filter is not applied to the luma coding tree block of the coding tree unit at luma location (xCtb, yCtb). When nonlocal_filter_ctb_flag is not present, it is inferred to be equal (slice_nonlocal_filter_all_ctb_enabled_flag & slice_nonlocal_filter_enabled_flag).

In some examples, it is provided to turn on/off nonlocal filter at picture level, slice level and CTU level, and the filtering parameters are signaled at slice level in the bitstream. Table 9 provides the syntax of slice header for this embodiment. In this example, the nonlocal_filter_param_set_idx is signaled at slice level if nonlocal filter is used for the current slice. The picture parameter set RBSP syntax and coding tree unit syntax are the same as Table 6 and Table 8.

TABLE 9

Slice header syntax for nonlocal filter

| | Descriptor |
|---|---|
| slice_header( ) { | |
| ... | |
| if( pps_bilateral_filter_enabled_flag ) { | |
| slice_nonlocal_filter_all_ctb_enabled_flag | u(1) |
| if( !slice_nonlocal_filter_all_ctb_enabled_flag ) | |
| slice_nonlocal_filter_enabled_flag | u(1) |
| If(slice_nonlocal_filter_enabled_flag) | |
| nonlocal_filter_param_set_idx | u(n) |
| } | |

In some examples, it is provided to turn on/off nonlocal filter at picture level, slice level and CTU level and sub-block level. If nonlocal filter is used for one specific CTU, the CTU is divided into N×N sub-blocks and an additional flag is signaled for each sub-block to indicate the usage of nonlocal filter for the sub-block. Table 10 provides the coding tree unit syntax for this embodiment.

TABLE 10

Coding tree unit syntax for nonlocal filter

| | Descriptor |
|---|---|
| coding_tree_unit( ) { | |
| ... | |
| if( !slice_nonlocal_filter_all_ctb_enabled_flag && slice_nonlocal_filter_enabled_flag ) | |
| nonlocal_filter_all_block_flag[ xCtb >> CtbLog2SizeY ][ yCtb >> CtbLog2SizeY ] | u(1) |
| if(!nonlocal_filter_all_block_flag[ xCtb >> CtbLog2SizeY ][ yCtb >> CtbLog2SizeY ]) | |
| nonlocal_filter_ctb_flag[ xCtb >> CtbLog2SizeY ][ yCtb >> CtbLog2SizeY ] | u(1) |
| if(!nonlocal_filter_all_block_flag[ xCtb >> CtbLog2SizeY ][ yCtb >> CtbLog2SizeY ] && nonlocal_filter_ctb_flag[ xCtb >> CtbLog2SizeY ][ yCtb >> CtbLog2Size Y ]) { | |
| for(i=0;i<NumSubBlocksInCtu;i++) { | |
| nonlocal_filter_subblock_flag | u(1) |
| } | |
| } | |

nonlocal_filter_all_block_flag equal to 1 specifies that the nonlocal filter is enabled for the CTU and is applied to all subblocks in the current CTB. When nonlocal_filter_all_block_flag is not present, it is inferred to be equal to 0.

nonlocal_filter_subblock_flag equal to 1 specifies that the nonlocal filter is enabled for the current sub-block.

Figure 10:
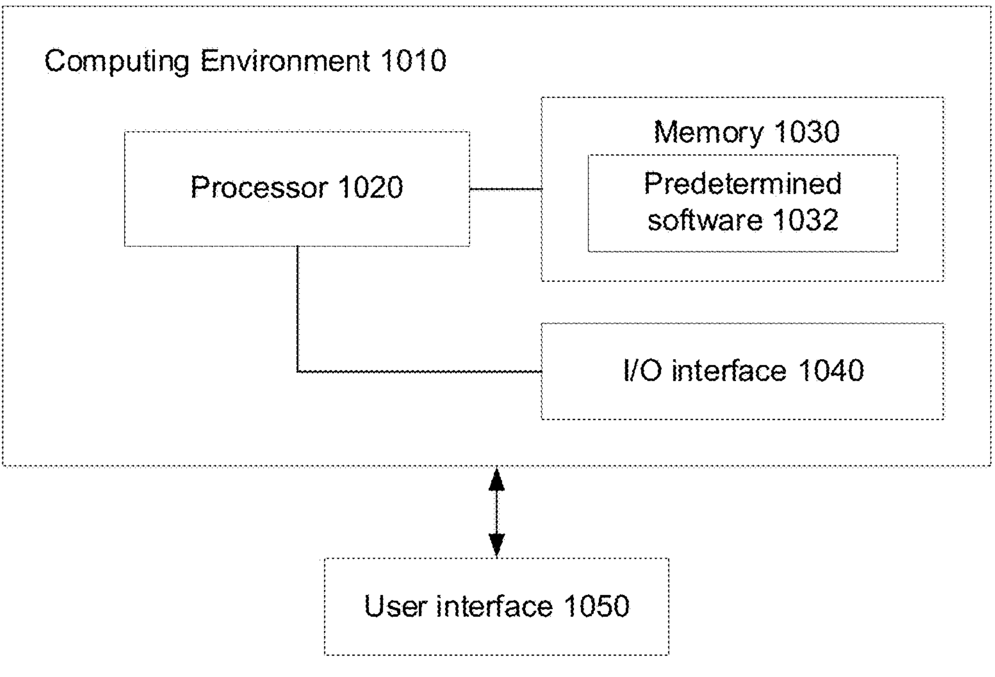
FIG. 10 illustrates a computing environment in accordance with some examples of the present disclosure.

FIG. 10 shows a computing environment (or a computing device) 1010 coupled with a user interface 1050. The computing environment 1010 can be part of a data processing server. In some embodiments, the computing device 1010 can perform any of various methods or processes (such as encoding/decoding methods or processes) as described hereinbefore in accordance with various examples of the present disclosure. The computing environment 1010 may include a processor 1020, a memory 1030, and an I/O interface 1040.

The processor 1020 typically controls overall operations of the computing environment 1010, such as the operations associated with the display, data acquisition, data communications, and image processing. The processor 1020 may include one or more processors to execute instructions to perform all or some of the steps in the above-described methods. Moreover, the processor 1020 may include one or more modules that facilitate the interaction between the processor 1020 and other components. The processor may be a Central Processing Unit (CPU), a microprocessor, a single chip machine, a GPU, or the like.

The memory 1030 is configured to store various types of data to support the operation of the computing environment 1010. Memory 1030 may include predetermine software 1032. Examples of such data include instructions for any applications or methods operated on the computing environment 1010, video datasets, image data, etc. The memory 1030 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1040 provides an interface between the processor 1020 and peripheral interface modules, such as a keyboard, a click wheel, buttons, and the like. The buttons may include but are not limited to, a home button, a start scan button, and a stop scan button. The I/O interface 1040 can be coupled with an encoder and decoder.

In some embodiments, there is also provided a non-transitory computer-readable storage medium including a plurality of programs, such as included in the memory 1030, executable by the processor 1020 in the computing environment 1010, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 1010 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

FIG. 11 is a flowchart illustrating a method for video encoding according to an example of the present disclosure.

In step 1101, the processor 1020, at the side of an encoder, may obtain one or more similar pixels for a first pixel that is to be filtered in a picture based on a filtering parameter set, where the one or more similar pixels and the first pixel are from the picture, and the filtering parameter set includes a number of similar blocks, a search range, and a window size.

In some examples, the processor 1020 may obtain the similar blocks based on SAD and obtain the one or more similar pixels respectively from the similar blocks.

In some examples, the processor 1020 may obtain the filtering parameter set according to quantization parameter (QP) values used in an encoding process.

In some examples, the processor 1020 may obtain the filtering parameter set according to a coding configuration used in an encoding process.

In some examples, the processor 1020 may determine one or more optimal filtering parameters from the filtering parameter set based on rate-distortion costs, signal the one or more optimal filtering parameters in a bitstream at a specified level which may be one of following levels: a picture level, a slice level, or a CTU level, and send the bitstream to a decoder.

In some examples, the processor 1020 may determine a candidate list for a filtering parameter from the filtering parameter set such that a decoder obtains an optimal filtering parameter from the candidate list according to rate-distortion costs.

In some examples, the filtering parameter set may further include a filter strength, and the filtering parameter set is associated with a non-local mean filter. Furthermore, the processor 1020 may compute a weighted average based on the one or more similar pixels and obtain the filtered pixel for the first pixel based on the weighted average.

In some examples, the filtering parameter set may further include one or more first estimation parameters for estimating deviation of compression noise, a second estimation parameter for estimating deviation of original patches, and a constant parameter for estimating thresholding values, and wherein the filtering parameter set is associated with a non-local low rank filter. Furthermore, the processor 1020 may compute a singular value decomposition (SVD) based on the one or more similar pixels and obtain the filtered pixel for the first pixel based on the SVD. For example, the one or more first estimation parameters may include $\alpha$ and $\beta$ parameters used in the filtering process in the nonlocal low rank filtering technique. The second estimation parameter may be the parameter $\omega$ used in the filtering process in the nonlocal low rank filtering technique. The constant parameter may be the constant c used in the filtering process in the nonlocal low rank filtering technique.

In some examples, the processor 1020 may divide the picture into a plurality of patches, classify the plurality of patches into a plurality of categories, and determine a plurality of filtering parameter sets for the plurality of categories, where the filtering parameter set is one filtering parameter set from the plurality of filtering parameter sets and is different from other filtering parameter sets in the plurality of filtering parameter sets.

In some examples, the processor 1020 may classify the plurality of patches into the plurality of categories based on directionality and activity.

In some examples, the processor 1020 may determine each filtering parameter set according to at least one of following parameters: a category, QP values used in an encoding process, or a coding configuration used in the encoding process. For example, QP-dependent filtering parameters may be used for nonlocal mean filters and for different QPs, different {number of similar blocks, search ranges, window sizes, filter strengths} set are used. For another example, the filtering parameter set of nonlocal mean filters may depend on coding configurations. That is to say for different coding configurations (intra, low delay and random access), different filtering parameter sets are used.

In some examples, the processor 1020 may signal one or more non-local filter enable syntax elements at a specified level that includes one or more of following levels: a picture level, a slice level, or a CTU level.

In some examples, the processor 1020 may determine that a non-local filter is enabled for slices referring to corresponding picture parameter set (PPS) in response to determining that a first non-local filter enable syntax element is signaled at the picture level and equal to 1. Furthermore, the processor 1020 may determine that non-local filter is disabled for the slices referring to the corresponding PPS in response to determining that the first non-local filter enable syntax element is signaled at the picture level and equal to 0. For example, the first non-local filter enable syntax element may be pps_nonlocal_filter_enabled_flag in Table 6.

In some examples, in response to determining that the first non-local filter enable syntax element is equal to 1, the processor 1020 may determine that the non-local filter is enabled and applied to all coding tree blocks (CTBs) in a current slice in response to determining that a second non-local filter enable syntax element is signaled at the slice level and equal to 1; infer that the second non-local filter enable syntax element is zero in response to determining that the second non-local filter enable syntax element is not present; determine that the non-local filter is enabled and apply to one or more CTBs in the current slice in response to determining that the second non-local filter enable syntax element is zero and a third non-local filter enable syntax element is signaled at the slice level and equal to 1; and infer that the third non-local filter enable syntax element is equal to the second non-local filter enable syntax element in response to determining that the second non-local filter enable syntax element is zero and the third non-local filter enable syntax element is equal to 0. For example, the second non-local filter enable syntax element may be slice_nonlocal_filter_all_ctb_enabled_flag in Table 7 and the third non-local filter enable syntax element may be slice_nonlocal_filter_enabled_flag in Table 7.

In some examples, in response to determining that the second non-local filter enable syntax element is equal to 0 and the third non-local filter enable syntax element is equal to 1, the processor 1020 may determine that the non-local filter is applied to a luma CTB in the CTU at a luma location in response to determining that a fourth non-local filter enable syntax element is equal to 1, determine that the non-local filter is not applied to the luma CTB in the CTU at the luma location in response to determining that the fourth non-local filter enable syntax element is equal to 0, and infer that the fourth non-local filter enable syntax element based on the second and third non-local filter enable syntax elements in response to determining that the fourth non-local filter enable syntax element is not present. For example, the fourth non-local filter enable syntax element may be nonlocal_filter_ctb_flag in Table 8.

In some examples, the processor 1020 may signal one or more filtering parameters in the filtering parameter set at the slice level in response to determining that the non-local filter is applied for the current slice.

In some examples, the specified level may further include a sub-block level and the processor 1020 may determine that the non-local filter is enable for the CTU and is applied to all subblocks in the current CTB in response to determining that the fifth non-local filter enable syntax element is equal to 1 and infer that the fifth non-local filter enable syntax element is equal to 0 in response to determining that the fifth non-local filter enable syntax element is not present.

In some examples, the processor 1020 may determine that the non-local filter is enable for the current sub-block in response to determining that the sixth non-local filter enable syntax element is equal to 1.

In step 1102, the processor 1020 may obtain a filtered pixel for the first pixel based on the one or more similar pixels.

Figure 12:
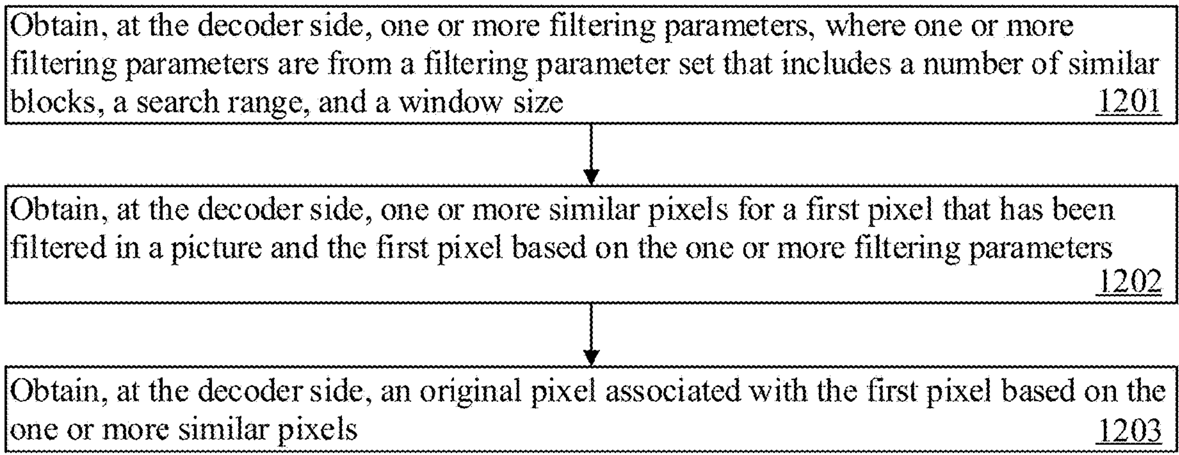
FIG. 12 is a flow chart illustrating a method for video decoding corresponding to the method for video decoding as shown in FIG. 11 in accordance with some examples of the present disclosure.

FIG. 12 is a flowchart illustrating a method for video decoding according to an example of the present disclosure.

In step 1201, the processor 1020, at the side of a decoder, may obtain one or more filtering parameters, where one or more filtering parameters are from a filtering parameter set that includes a number of similar blocks, a search range, and a window size.

In some examples, the processor 1020 may obtain the filtering parameter set according to QP values used in an encoding process.

In some examples, the processor 1020 may obtain the filtering parameter set according to a coding configuration used in an encoding process.

In some examples, the processor 1020 may obtain the one or more filtering parameters signaled at a specified level in a bitstream received from an encoder, where the specified level may include one of following levels: a picture level, a slice level, or a CTU level.

In some examples, the processor 1020 may obtain an optimal filtering parameter from a candidate list for a filtering parameter from the filtering parameter set according to rate-distortion costs.

In some examples, the filtering parameter set further includes a filter strength, and the filtering parameter set is associated with a non-local mean filter.

In some examples, the filtering parameter set further includes one or more first estimation parameters for estimating deviation of compression noise, a second estimation parameter for estimating deviation of original image patches, and a constant parameter for estimating thresholding values, and wherein the filtering parameter set is associated with a non-local low rank filter.

In some examples, the filtering parameter set is one filtering parameter set from a plurality of filtering parameter sets, and the plurality of filtering parameters sets are corresponding to a plurality of categories for a plurality of patches from the picture.

In some examples, the plurality of patches are classified into the plurality of categories based on directionality and activity.

In some examples, each filtering parameter set is determined according to at least one of following parameters: a category, QP values used in an encoding process, or a coding configuration used in the encoding process. For example, QP-dependent filtering parameters may be used for nonlocal mean filters and for different QPs, different {number of similar blocks, search ranges, window sizes, filter strengths} set are used. For another example, the filtering parameter set of nonlocal mean filters may depend on coding configurations. That is to say for different coding configurations (intra, low delay and random access), different filtering parameter sets are used.

In some examples, the processor 1020 may obtain one or more non-local filter enable syntax elements at a specified level that includes one or more of following levels: a picture level, a slice level, or a CTU level.

In some examples, the processor 1020 may determine that a non-local filter is enabled for slices based on corresponding picture parameter set (PPS). For example, the processor 1020 may determine that a non-local filter is enabled for slices referring to corresponding picture parameter set (PPS) in response to determining that a first non-local filter enable syntax element is signaled at the picture level and equal to 1. Furthermore, the processor 1020 may determine that non-local filter is disabled for the slices referring to the corresponding PPS in response to determining that the first non-local filter enable syntax element is signaled at the picture level and equal to 0. For example, the first non-local filter enable syntax element may be pps_nonlocal_filter_enabled_flag in Table 6.

In some examples, in response to determining that the first non-local filter enable syntax element is equal to 1, the processor 1020 may determine that the non-local filter is enabled and applied to all coding tree blocks (CTBs) in a current slice in response to determining that a second non-local filter enable syntax element is signaled at the slice level and equal to 1; infer that the second non-local filter enable syntax element is zero in response to determining that the second non-local filter enable syntax element is not present; determine that the non-local filter is enabled and apply to one or more CTBs in the current slice in response to determining that the second non-local filter enable syntax element is zero and a third non-local filter enable syntax element is signaled at the slice level and equal to 1; and infer that the third non-local filter enable syntax element is equal to the second non-local filter enable syntax element in response to determining that the second non-local filter enable syntax element is zero and the third non-local filter enable syntax element is equal to 0. For example, the second non-local filter enable syntax element may be slice_nonlocal_filter_all_ctb_enabled_flag in Table 7 and the third non-local filter enable syntax element may be slice_nonlocal_filter_enabled_flag in Table 7.

In some examples, in response to determining that the second non-local filter enable syntax element is equal to 0 and the third non-local filter enable syntax element is equal to 1, the processor 1020 may determine that the non-local filter is applied to a luma CTB in the CTU at a luma location in response to determining that a fourth non-local filter enable syntax element is equal to 1, determine that the non-local filter is not applied to the luma CTB in the CTU at the luma location in response to determining that the fourth non-local filter enable syntax element is equal to 0, and infer that the fourth non-local filter enable syntax element based on the second and third non-local filter enable syntax elements in response to determining that the fourth non-local filter enable syntax element is not present. For example, the fourth non-local filter enable syntax element may be nonlocal_filter_ctb_flag in Table 8.

In some examples, the processor 1020 may pre-define one or more filtering parameters in the filtering parameter set.

In some examples, the processor 1020 may obtain the one or more filtering parameters at the slice level in response to determining that the non-local filter is applied for the current slice.

In some examples, the processor 1020 may obtain a fifth non-local filter enable syntax element that indicates whether the non-local filter is enabled for the CTU and applied to all sub-blocks in a current CTB and obtain a sixth non-local filter enable syntax element that indicates whether the non-local filter is enabled for a current sub-block.

In some examples, the processor 1020 may determine that the non-local filter is enable for the CTU and is applied to all subblocks in the current CTB in response to determining that the fifth non-local filter enable syntax element is equal to 1. Furthermore, the processor 1020 may infer that the fifth non-local filter enable syntax element is equal to 0 in response to determining that the fifth non-local filter enable syntax element is not present.

In some examples, the processor 1020 may determine that the non-local filter is enable for the current sub-block in response to determining that the sixth non-local filter enable syntax element is equal to 1.

In step 1202, the processor 1020 may obtain one or more similar pixels for a first pixel that has been filtered in a picture and the first pixel based on the one or more filtering parameters.

In some examples, the processor 1020 may obtain one or more similar blocks based on SAD and obtain the one or more similar pixels respectively from the one or more similar blocks.

In step 1203, the processor 1020 may obtain an original pixel associated with the first pixel based on the one or more similar pixels.

In some examples, there is provided an apparatus for video coding. The apparatus includes a processor 1020 and a memory 1030 configured to store instructions executable by the processor; where the processor, upon execution of the instructions, is configured to perform any method as illustrated in FIGS. 11-12.

In some other examples, there is provided a non-transitory computer readable storage medium, having instructions stored therein. When the instructions are executed by a processor 1020, the instructions cause the processor to perform any method as illustrated in FIGS. 11-12. In one example, the plurality of programs may be executed by the processor 1020 in the computing environment 1010 to receive (for example, from the video encoder 20 in FIG. 1G) a bitstream or data stream including encoded video information (for example, video blocks representing encoded video frames, and/or associated one or more syntax elements, etc.), and may also be executed by the processor 1020 in the computing environment 1010 to perform the decoding method described above according to the received bitstream or data stream. In another example, the plurality of programs may be executed by the processor 1020 in the computing environment 1010 to perform the encoding method described above to encode video information (for example, video blocks representing video frames, and/or associated one or more syntax elements, etc.) into a bitstream or data stream, and may also be executed by the processor 1020 in the computing environment 1010 to transmit the bitstream or data stream (for example, to the video decoder 30 in FIG. 2B). Alternatively, the non-transitory computer-readable storage medium may have stored therein a bitstream or a data stream including encoded video information (for example, video blocks representing encoded video frames, and/or associated one or more syntax elements etc.) generated by an encoder (for example, the video encoder 20 in FIG. 1G) using, for example, the encoding method described above for use by a decoder (for example, the video decoder 30 in FIG. 2B) in decoding video data. The non-transitory computer-readable storage medium may be, for example, a ROM, a Random Access Memory (RAM), a CD-ROM, a magnetic tape, a floppy disc, an optical data storage device or the like.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A method for video decoding, comprising:

obtaining, by a decoder, one or more filtering parameters, wherein the one or more filtering parameters are from a filtering parameter set comprising a number of similar blocks, a search range, and a window size;

obtaining, by the decoder and based on the one or more filtering parameters, one or more similar pixels for a first pixel that has been filtered in a picture and the first pixel;

obtaining, by the decoder, an original pixel associated with the first pixel based on the one or more similar pixels; and obtaining, by the decoder, one or more non-local filter enable syntax elements at a specified level that comprises one or more of following levels: a picture level, a slice level, or a coding tree unit (CTU) level;

wherein, in response to determining, by the decoder, that a first non-local filter enable syntax element is signaled at the picture level and equal to 1, the method further comprises:

determining, by the decoder, that a non-local filter is enabled for slices referring to corresponding picture parameter set (PPS);

in response to determining, by the decoder, that a second non-local filter enable syntax element is signaled at the slice level and equal to 1, determining, by the decoder, that the non-local filter is enabled and applied to all coding tree blocks (CTBs) in a current slice;

in response to determining, by the decoder, that the second non-local filter enable syntax element is not present, inferring, by the decoder, that the second non-local filter enable syntax element is zero;

in response to determining, by the decoder, that the second non-local filter enable syntax element is zero and a third non-local filter enable syntax element is signaled at the slice level and equal to 1, determining, by the decoder, that the non-local filter is enabled and apply to one or more CTBs in the current slice; and in response to determining, by the decoder, that the second non-local filter enable syntax element is zero and the third non-local filter enable syntax element is equal to 0, inferring, by the decoder, that the third non-local filter enable syntax element is equal to the second non-local filter enable syntax element.

2. The method of claim 1, wherein obtaining the one or more similar pixels comprises:

obtaining, by the decoder and based on Sum Absolute Difference (SAD), one or more similar blocks; and obtaining, by the decoder, the one or more similar pixels respectively from the one or more similar blocks.

3. The method of claim 1, wherein obtaining the one or more filtering parameters comprises:

obtaining, by the decoder, the one or more filtering parameters signaled at a specified level in a bitstream received from an encoder, wherein the specified level comprises one of following levels: a picture level, a slice level, or a coding tree unit (CTU) level.

4. The method of claim 1, further comprising:

obtaining, by the decoder, an optimal filtering parameter from a candidate list for a filtering parameter from the filtering parameter set according to rate-distortion costs.

5. The method of claim 1, wherein the filtering parameter set further comprises a filter strength, and the filtering parameter set is associated with a non-local mean filter.

6. The method of claim 1, wherein the filtering parameter set further comprises one or more first estimation parameters for estimating deviation of compression noise, a second estimation parameter for estimating deviation of original image patches, and a constant parameter for estimating thresholding values, and the filtering parameter set is associated with a non-local low rank filter.

7. The method of claim 1, wherein the filtering parameter set is one filtering parameter set from a plurality of filtering parameter sets, and the plurality of filtering parameters sets are corresponding to a plurality of categories for a plurality of patches from the picture.

8. The method of claim 7, wherein the plurality of patches are classified into the plurality of categories based on directionality and activity.

9. The method of claim 7, wherein each filtering parameter set is determined according to at least one of following parameters:

a category, quantization parameter (QP) values used in an encoding process, or a coding configuration used in the encoding process.

10. The method of claim 1, further comprising:

in response to determining, by the decoder, that the first non-local filter enable syntax element is signaled at the picture level and equal to 0, determining, by the decoder, that the non-local filter is disabled for the slices referring to the corresponding PPS.

11. The method of claim 1, wherein in response to determining, by the decoder, that the second non-local filter enable syntax element is equal to 0 and the third non-local filter enable syntax element is equal to 1, the method further comprises:

in response to determining, by the decoder, that a fourth non-local filter enable syntax element is equal to 1, determining, by the decoder, that the non-local filter is applied to a luma CTB in a CTU at a luma location;

in response to determining, by the decoder, that the fourth non-local filter enable syntax element is equal to 0, determining, by the decoder, that the non-local filter is not applied to the luma CTB in the CTU at the luma location; and in response to determining, by the decoder, that the fourth non-local filter enable syntax element is not present, inferring, by the decoder, that the fourth non-local filter enable syntax element based on the second and third non-local filter enable syntax elements.

12. The method of claim 11, further comprising:

pre-defining, by the decoder, one or more filtering parameters in the filtering parameter set; or in response to determining, by the decoder, that the non-local filter is applied for the current slice, obtaining, by the decoder, the one or more filtering parameters at the slice level.

13. The method of claim 11, wherein the specified level further comprises a sub-block level, and the method further comprises:

obtaining, by the decoder, a fifth non-local filter enable syntax element that indicates whether the non-local filter is enabled for the CTU and applied to all sub-blocks in a current CTB; and obtaining, by the decoder, a sixth non-local filter enable syntax element that indicates whether the non-local filter is enabled for a current sub-block.

14. The method of claim 13, further comprising:

in response to determining, by the decoder, that the fifth non-local filter enable syntax element is equal to 1, determining, by the decoder, that the non-local filter is enable for the CTU and is applied to all subblocks in the current CTB;

in response to determining, by the decoder, that the fifth non-local filter enable syntax element is not present, inferring, by the decoder, that the fifth non-local filter enable syntax element is equal to 0; or in response to determining, by the decoder, that the sixth non-local filter enable syntax element is equal to 1, determining, by the decoder, that the non-local filter is enable for the current sub-block.

15. An apparatus for video coding, comprising:

one or more processors; and a memory coupled to the one or more processors and configured to store instructions executable by the one or more processors, wherein the one or more processors, upon execution of the instructions, are configured to perform a method for video coding, the method comprising:

obtaining one or more filtering parameters, wherein the one or more filtering parameters are from a filtering parameter set comprising a number of similar blocks, a search range, and a window size;

obtaining, based on the one or more filtering parameters, one or more similar pixels for a first pixel that has been filtered in a picture and the first pixel;

obtaining an original pixel associated with the first pixel based on the one or more similar pixels; and obtaining one or more non-local filter enable syntax elements at a specified level that comprises one or more of following levels: a picture level, a slice level, or a coding tree unit (CTU) level;

wherein, in response to determining that a first non-local filter enable syntax element is signaled at the picture level and equal to 1, the method further comprises:

determining that a non-local filter is enabled for slices referring to corresponding picture parameter set (PPS);

in response to determining that a second non-local filter enable syntax element is signaled at the slice level and equal to 1, determining that the non-local filter is enabled and applied to all coding tree blocks (CTBs) in a current slice;

in response to determining that the second non-local filter enable syntax element is not present, inferring that the second non-local filter enable syntax element is zero;

in response to determining that the second non-local filter enable syntax element is zero and a third non-local filter enable syntax element is signaled at the slice level and equal to 1, determining that the non-local filter is enabled and apply to one or more CTBs in the current slice; and in response to determining that the second non-local filter enable syntax element is zero and the third non-local filter enable syntax element is equal to 0, inferring that the third non-local filter enable syntax element is equal to the second non-local filter enable syntax element.

16. A non-transitory computer readable storage medium storing a bitstream to be decoded by the method according to claim 1.

17. A method for video encoding, comprising:

obtaining, by an encoder and based on a filtering parameter set, one or more similar pixels for a first pixel that is to be filtered in a picture, wherein the one or more similar pixels and the first pixel are from the picture, and wherein the filtering parameter set comprises a number of similar blocks, a search range, and a window size;

obtaining, by the encoder and based on the one or more similar pixels, a filtered pixel for the first pixel; and signaling, by the encoder, one or more non-local filter enable syntax elements at a specified level that comprises one or more of following levels: a picture level, a slice level, or a coding tree unit (CTU) level;

wherein, in response to determining that a first non-local filter enable syntax element is signaled at the picture level and equal to 1, the method further comprises:

determining that a non-local filter is enabled for slices based on corresponding picture parameter set (PPS);

in response to determining that a second non-local filter enable syntax element is signaled at the slice level and equal to 1, determining that the non-local filter is enabled and applied to all coding tree blocks (CTBs) in a current slice;

in response to determining that the second non-local filter enable syntax element is not present, inferring that the second non-local filter enable syntax element is zero;

in response to determining that the second non-local filter enable syntax element is zero and a third non-local filter enable syntax element is signaled at the slice level and equal to 1, determining that the non-local filter is enabled and apply to one or more CTBs in the current slice; and in response to determining that the second non-local filter enable syntax element is zero and the third non-local filter enable syntax element is equal to 0, inferring that the third non-local filter enable syntax element is equal to the second non-local filter enable syntax element.

18. A method for storing a bitstream, comprising:

performing the method for video encoding according to claim 17 to generate a bitstream; and storing the bitstream.

19. The method of claim 1, further comprising:

obtaining, by the decoder, the filtering parameter set according to quantization parameter (QP) values used in an encoding process.

20. The method of claim 1, further comprising:

obtaining, by the decoder, the filtering parameter set according to a coding configuration used in an encoding process.

* * * * *